United States Patent [19]

Tomohisa et al.

[11] Patent Number: 4,636,869
[45] Date of Patent: Jan. 13, 1987

[54] METHOD AND SYSTEM FOR RECORDING IMAGES IN VARIOUS MAGNIFICATION RATIOS

[75] Inventors: Kunio Tomohisa, Kyoto; Kiyoshi Maeda, Takatsuki; Koji Yao, Otsu, all of Japan

[73] Assignee: Dainippon Screen Mfg. Co., Ltd., Kyoto, Japan

[21] Appl. No.: 546,046

[22] Filed: Oct. 27, 1983

[30] Foreign Application Priority Data

Jan. 18, 1983 [JP] Japan .................................... 58-7096
Jan. 27, 1983 [JP] Japan .................................. 58-12545

[51] Int. Cl.⁴ .......................... H04N 1/04; H04N 1/46
[52] U.S. Cl. ...................................... 358/287; 358/77; 358/296
[58] Field of Search ................. 358/287, 77, 288, 138, 358/296, 285; 355/8

[56] References Cited

U.S. PATENT DOCUMENTS

| | | | |
|---|---|---|---|
| 3,272,918 | 9/1966 | Koll et al. | 358/287 |
| 4,163,605 | 8/1979 | Yamada | 358/287 |
| 4,301,479 | 11/1981 | Fukinuki et al. | 358/288 |
| 4,318,134 | 3/1982 | Partridge et al. | 358/287 |
| 4,327,380 | 4/1982 | Yamada et al. | 358/287 |
| 4,423,439 | 12/1983 | Watanabe | 358/77 |
| 4,454,537 | 6/1984 | Okada et al. | 358/77 |
| 4,470,074 | 9/1984 | Yamada | 358/287 |

FOREIGN PATENT DOCUMENTS

| | | |
|---|---|---|
| 0105517 | 4/1986 | European Pat. Off. . |
| 52-226413 | 7/1977 | Japan . |
| 54-35613 | 3/1979 | Japan . |
| 54-65601 | 5/1979 | Japan . |
| 1423424 | 2/1983 | Japan . |
| 2100093 | 5/1982 | United Kingdom . |

Primary Examiner—James J. Groody
Assistant Examiner—John K. Peng
Attorney, Agent, or Firm—Lowe Price LeBlanc Becker & Shur

[57] ABSTRACT

In reproducing images, magnification conversion is performed either by reading image data from a memory in a skipped or overlapped fashion of their addresses of sub-scanning direction factor or by scanning certain scanning lines of an original picture (recording film) in a skipped or overlapped fashion in the sub-scanning direction according to a specified magnification ratio.

13 Claims, 22 Drawing Figures

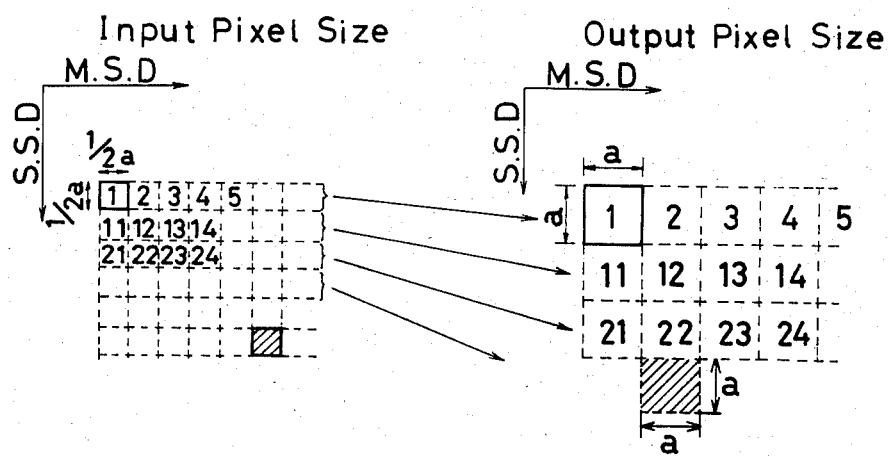

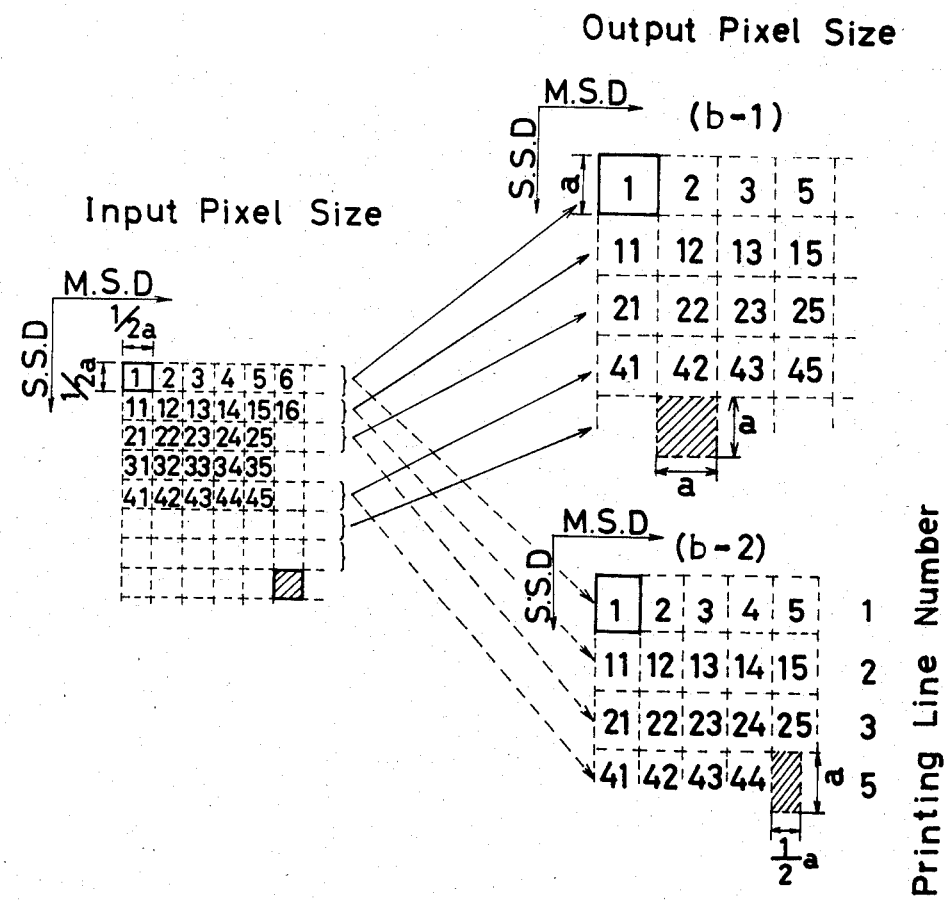

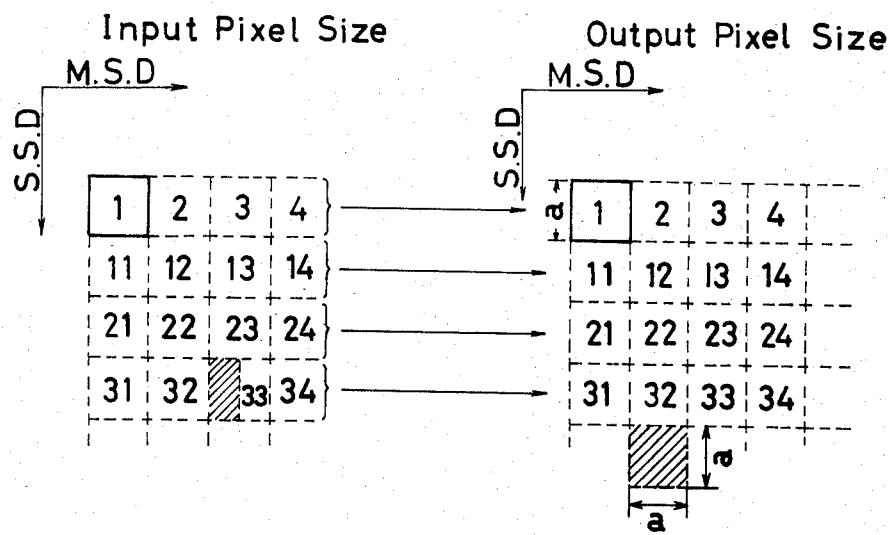
FIG.2(C) M=100%

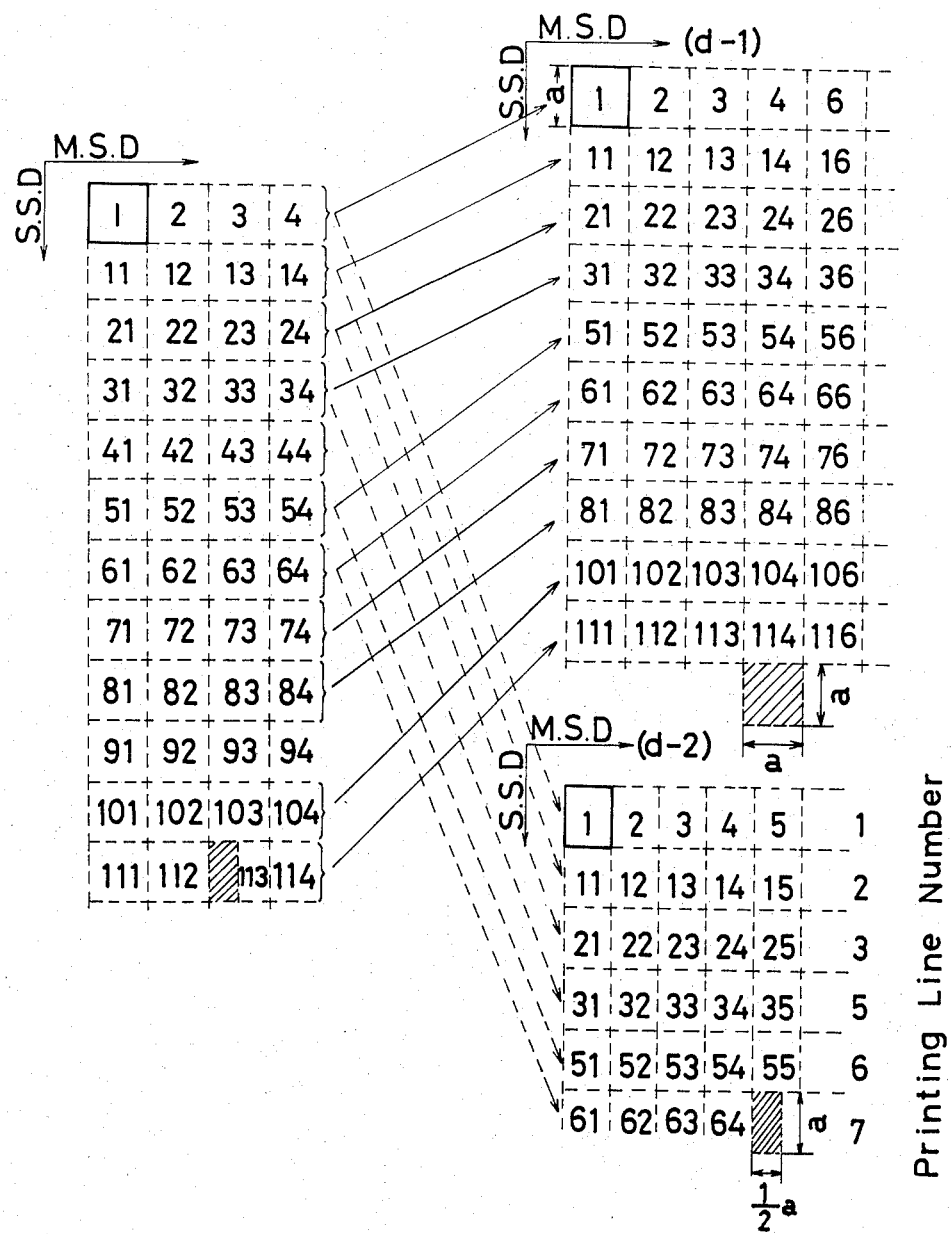
FIG.2(d) M=80%

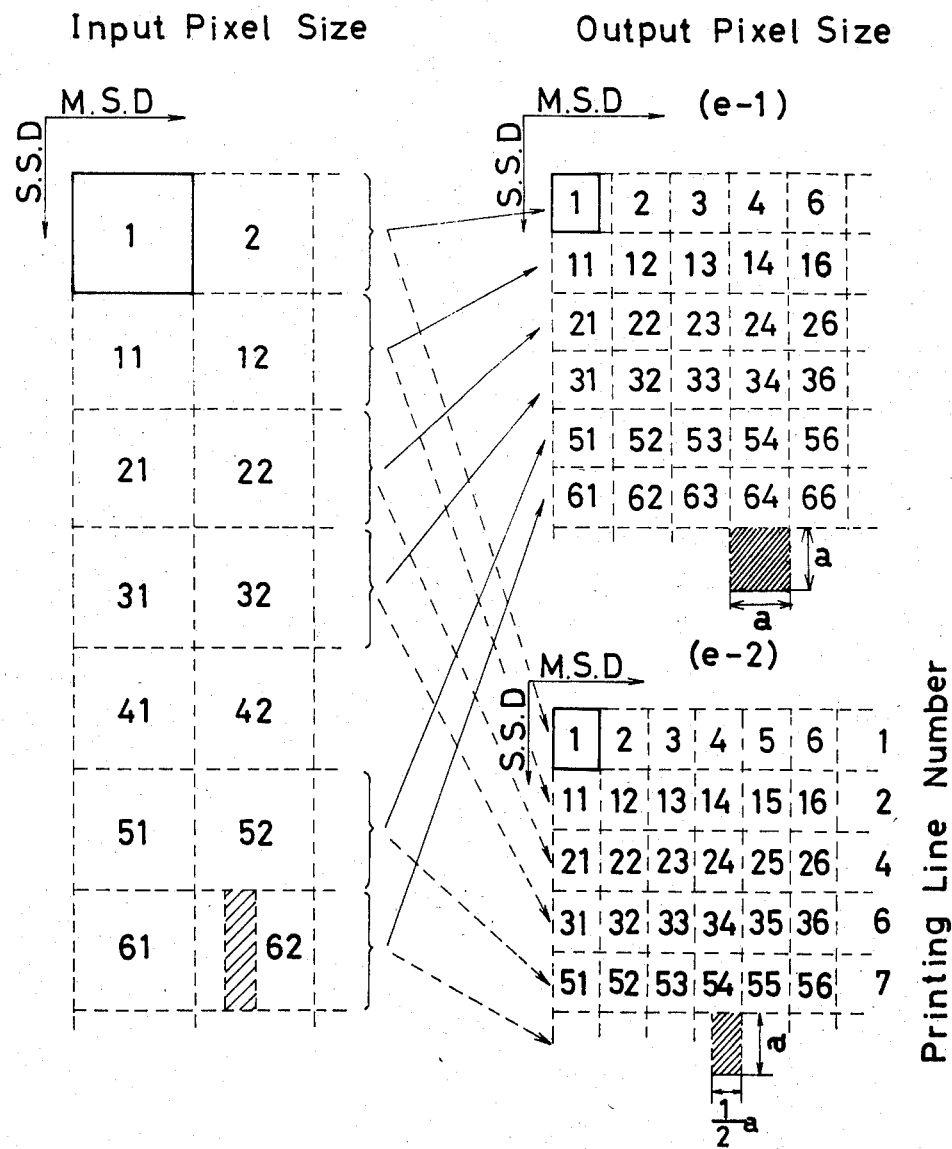

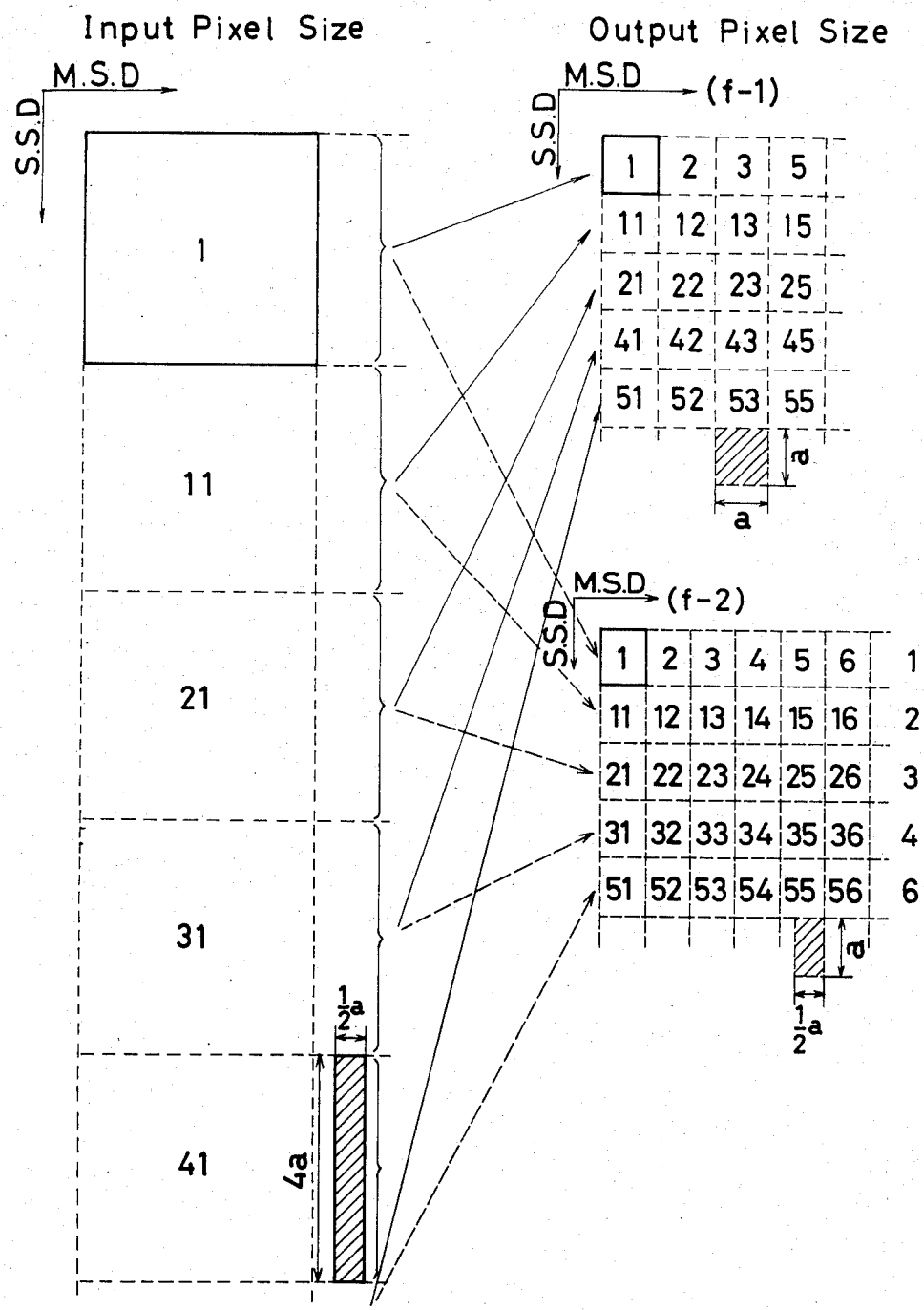

FIG. 11
(a) Synchronizing Signal (S1)
(b1) Step-motor Driving Signal M=150% ($\frac{1}{2}$a pulse)
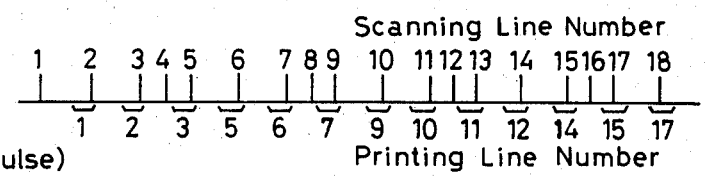
(b2) M 80% (a pulse)
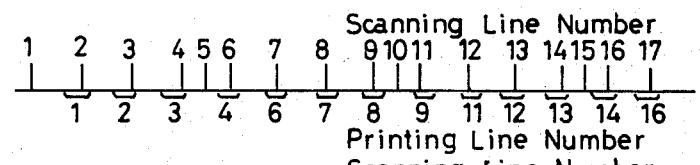
(b3) M 60% (a pulse)
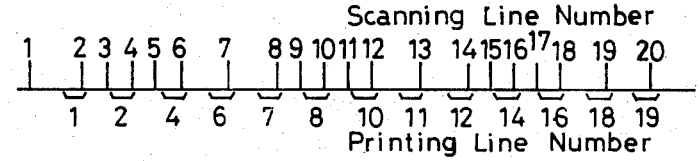
(b4) M 40% (2a pulse)
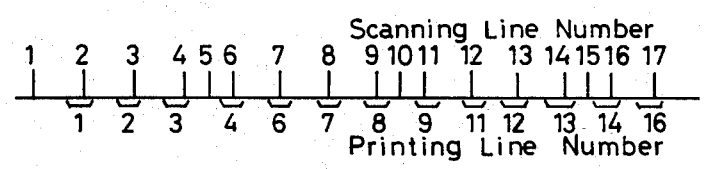
(b5) M 30% (2a pulse)
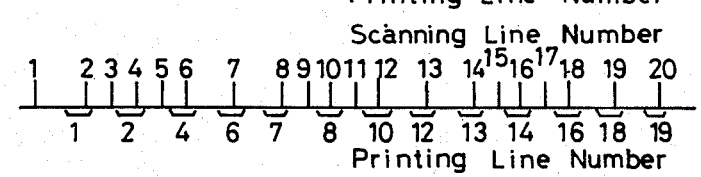
(b6) M 20% (4a pulse)
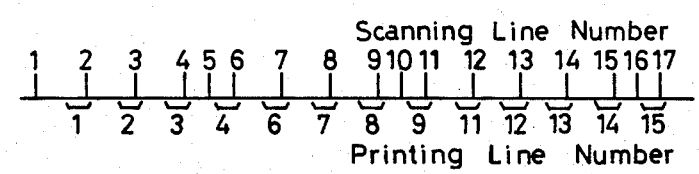

FIG. 13
(a) Image Signal
(b) Sampling Clock (S₄)
(c) $101 \leq M \leq 200$
(d) $51 \leq M \leq 100$
(e) $26 \leq M \leq 50$
(f) $13 \leq M \leq 25$
Writing Pulse (S₅)
(g) Dot Pattern Reading Clock (S'₄)
(h) Memory Reading Pulse (S₆) ($f_o = \frac{f_i}{M_o}$)
(i) Timing Clock for Digital Comparator (S'₄)
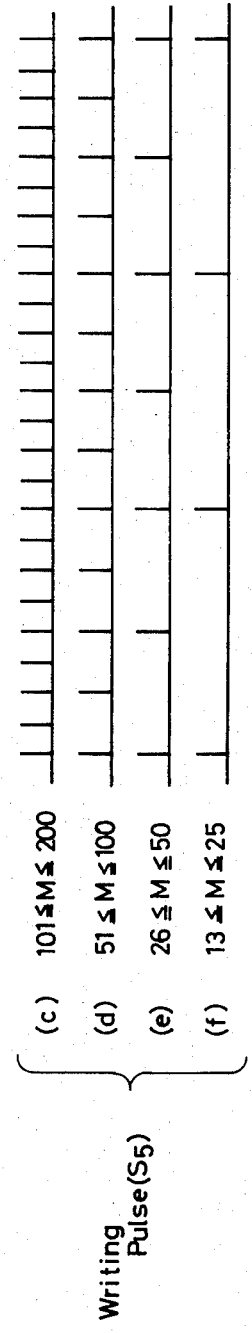
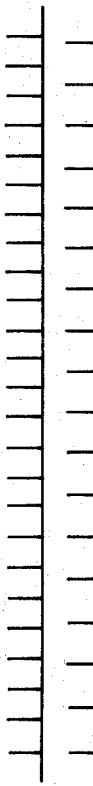
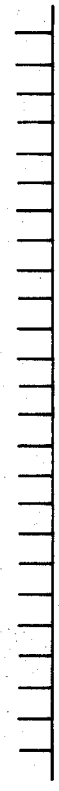

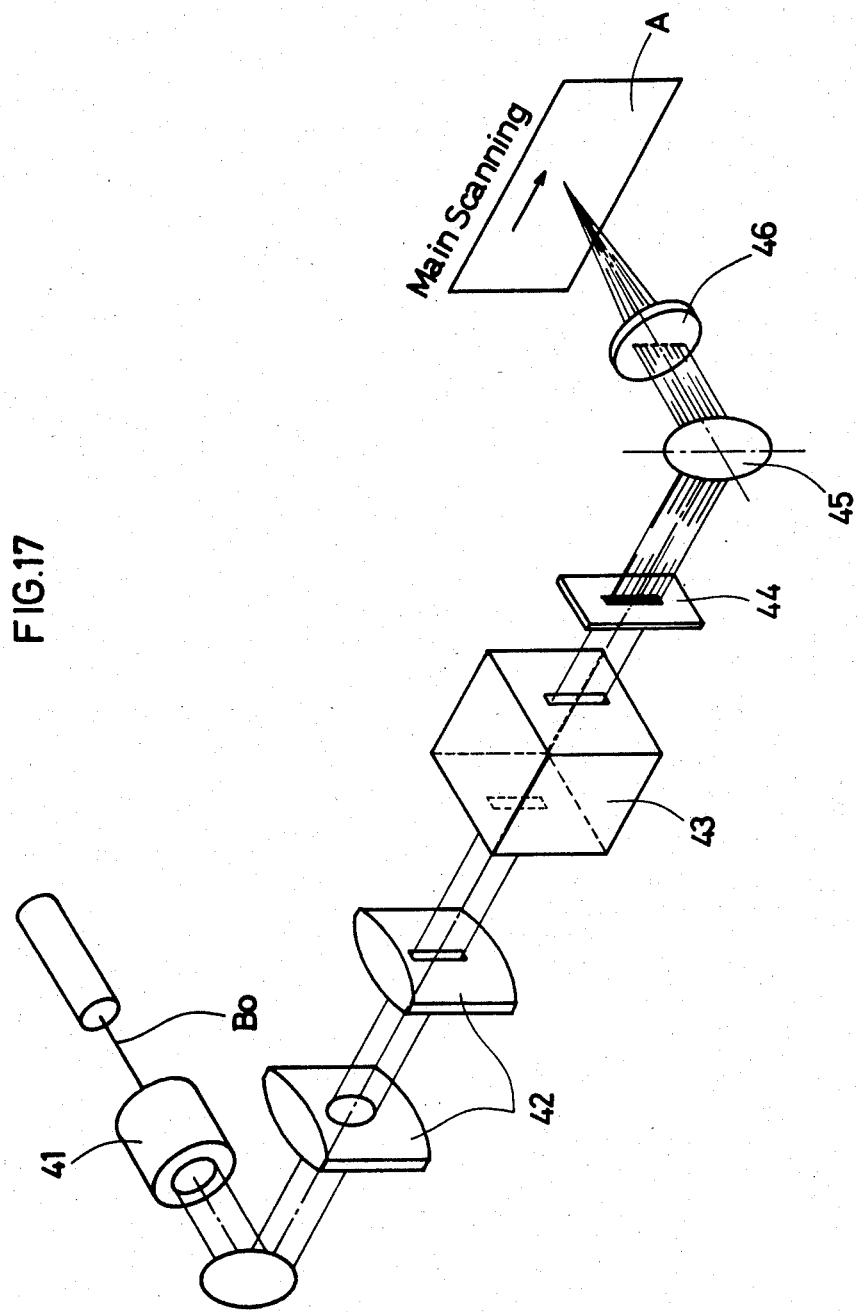

METHOD AND SYSTEM FOR RECORDING IMAGES IN VARIOUS MAGNIFICATION RATIOS

FIELD OF THE INVENTION

This invention relates to a method and system for recording images in various magnification ratios in reproducing images by using a laser beam scanner or a drum scanner, particularly to such a method and system adopting a new way of step-like magnification conversion of the sub-scanning direction factor.

BACKGROUND OF THE INVENTION

An image reproducing system has functions of storing image data obtained from scanning of an original picture into a memory and recording a photosensitive film by using the image data being read from the memory.

Conventionally, several ways of converting magnification ratio in reproducing images are known, one of which is for example the method disclosed in U.S. Ser. No. 924,928, now abandoned. This method is characteristic of varying revolution frequency and feeding speed of an input head in the sub-scanning direction according to a specified magnification ratio while fixing revolution frequency and feeding speed of a recording head in the sub-scanning direction to reproduce an image with magnification conversion. And in this method, both frequencies of a writing pulse for inputting an image data to a memory and a reading pulse for outputting the image data from the memory are identical or in a certain ratio.

Secondly, the method disclosed in U.S. Pat. No. 3,272,918 can be exemplified. The method is described as follows. For the sub-scanning direction factor, magnification conversion is attained by varying feeding speed of a recording head while fixing feeding speed of an input head. For the main scanning direction factor, magnification conversion is attained by varying frequency ratio of a writing pulse and a reading pulse for an image data when being input to or output from a memory while fixing revolving speed of both drums. In this, as the reading pulse has a constant frequency, the magnification conversion is attained by varying frequency of the writing pulse, which has a higher frequency when a reproduced image is to be expanded and has a lower frequency when a reproduced image is to be contracted.

Other from the abovementioned two methods, the method disclosed in U.S. Pat. No. 4,163,605 or in U.S. Ser. Nos. 933,714 now abandoned or 170,127 now abandoned can be cited. The method adopts the following way to vary magnification ratio. While fixing revolution frequency of an original picture drum and a recording drum, and feeding speed of the recording head in the sub-scanning direction, magnification conversion for the sub-scanning direction factor is attained by varying feeding speed of the input head, and magnification conversion for the main-scanning direction is attained by fixing a relation between a writing pulse frequency and a reading pulse frequency at 1:1, and by reading an image data from said memory in a skipped or in an overlapped fashion of their addresses.

The abovementioned three methods function well for magnification conversion of the main scanning direction factor, but magnification conversion for the sub-scanning direction factor is attained only by varying relative feeding speed of between the input head and the output head.

However as it is difficult to vary the diameter of an input scanning beam smoothly, an uneven density distribution of a reproduced image is unavoidable in the prior art even when magnification ratio is varied by using any one of aforesaid methods.

SUMMARY OF THE INVENTION

The object of this invention is to provide a method of performing magnification conversion for the sub-scanning direction factor in an economical and simpler way resolving the abovementioned defects to provide an even density distribution of a recorded film in reproducing images.

When magnification conversion for the sub-scanning direction factor must be performed, this invention attains that at first by varying the size of an input scanning beam of the sub-scanning direction in steps according to a specified magnification ratio while varying feeding pitch of the input scanning beam in a step-like manner in correspondence with the beam width, and then by processing image data obtained from an original picture into a skipped or an overlapped fashion of the sub-scanning direction factor in an optional stage of reproducing images. Practically, the abovementioned procedure can be accomplished for example by reading the image data in a skipped or in an overlapped fashion when they are read from a memory or by scanning the original picture in a skipped or in an overlapped fashion making the input head feed according to said beam size in the sub-scanning direction.

The above and other objects and features of this invention can be appreciated more fully from the following detailed description when read with reference to the accompanying drawings.

BRIEF DESCRIPTION OF THE DRAWINGS

FIGS. 2(a), 2(b), 2(c), 2(d), 2(e) and 2(f) show relations of between pixels of input side and pixels of output side for explaining the method of this invention.

FIG. 11 is a timing chart explaining a relation of between magnification ratio M and a control signal for a step motor of this invention.

FIG. 13 is a timing chart of the operation of the laser beam scanner shown in FIG. 12.

FIG. 17 is a schematic drawing of an optical system for obtaining the multi-beam.

PREFERRED EMBODIMENT OF THE INVENTION

Figure 1:
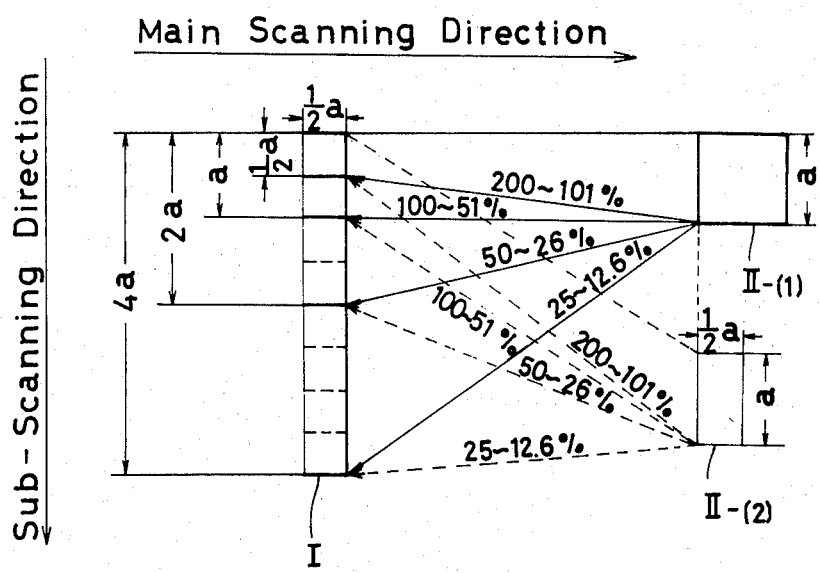
FIG. 1 shows beam sizes of an input and an output scanning heads of this invention.

FIG. 1 shows variation of the size of the beam I of an input head with respect to that of a recording head regarding their sub-scanning direction. In FIG. 1, postulating that the size of the recording beam II is "a" and the minimum size of the input beam I is "a/2 or ($\frac{1}{2}$)a" in the sub-scanning direction, the size of the input beam I must be made to be variable in steps according to variation of magnification ratio. For example, assuming that the magnification ratio is varied in four steps, having ranges of from 200% to 101%, from 100% to 51%, from 50% to 26% and from 25% to 12.5%, the size of said input beam I can be "($\frac{1}{2}$)a", "a", "2a" and "4a" respectively in the sub-scanning direction. In other words, the size of the input beam I is varied in steps by factors of 1, 2, 4 or 8 in the sub-scanning direction, which correspond to feeding pitch of the input head in the sub-scanning direction as mentioned later.

Meanwhile, the size of the input beam I of the main scanning direction is varied according to a sampling frequency, in FIG. 1 it is "($\frac{1}{2}$)a" the same as the minimum size of the sub-scanning direction, the sampling frequency for an image signal of the main scanning direction is determined according to said minimum beam size.

Next, the beam size of a recording beam of the sub-scanning direction can be varied according to variation of the magnification ratio. In FIG. 1, the size of the recording beam of the sub-scanning direction is fixed at "a" in order to obtain the magnification ratio as shown in FIG. 2 (mentioned later) without varying feeding pitch for recording lines. The size of the recording beam of the sub-scanning direction varies with an adopted magnification conversion method. FIG. 1 shows two types of said beam size, which shows a case where the size is "a" (II-(1)) and a case the size is "($\frac{1}{2}$)a" (II-(2)).

FIGS. 2(a) to (f) shows a relation between pixels of the input side and pixels of the output side when recorded in several magnification ratios, and the hatched squares shows section shapes of a scanning beam and a recording beam.

At first, in the following explanation the pixels of the output side (1) are recorded by using said method of reading image data read from a memory in a skipped fashion of their addresses. In this method, an input beam can be varied in size in steps of the main scanning direction so as to reduce deterioration of quality of a reproduced image to be permissible.

In this, feeding pitch of the output side is fixed on the point corresponding to the magnification ratio of 100% in the sub-scanning direction.

Moreover, this method adopts a way of reading the image data from the memory in a skipped fashion of its main scanning direction. FIG. 2(a) shows a case where the magnification ratio M is 200%. In this case, the size of the input scanning beam is "($\frac{1}{2}$)a×($\frac{1}{2}$)a" as shown in hatched area. At first on the input side, image data are sampled by scanning an original picture in order of 1, 2, 3 ... 11, 12, 13 ... 21, 22, 23 ... of its pixels in a timing corresponding to the beam size "($\frac{1}{2}$)a" of the sub-scanning direction with use of said input scanning beam. Then thus obtained image data are used for driving the ouptut scanning beam having a size of "a×a" which records pixels corresponding to said input pixels in order of 1, 2, 3 ... 11, 12, 13 ... 21 22, 23 ... in a timing corresponding to the beam size "a" of the output scanning beam. As a result, a reproduced image is recorded in the magnification ratio of 200%. In this case, no scanning life of the input side is skipped over.

Next, FIG. 2(b-1) shows a case the magnification ratio is 150%. To attain this ratio, the sizes of the input beam and the output beam, the timing of picking up the image data and exposing can be done in the same manner as for the ratio of 200%. However, every fourth scanning line of the input side are skipped over in the main scanning direction and in the sub-scanning direction when scanned from the original picture. To attain the magnification ratio of 100% as shown in FIG. 2(c), the same manner for the ratio of 200% or 150% can be applied to pick up the image data, but the size of the input scanning beam must be "($\frac{1}{2}$)a (main scanning direction)×a (sub-scanning direction)". In this case, image data for driving the recording beam can be obtained by averaging or picking one of the image data corresponding to several scanning lines (in this case, two scanning lines), wherein no scanning line of the input side is skipped over as well as for the ratio of 200%, however when the magnification ratio of 80% is attained, every fifth scanning line of the input side are skipped over as shown in FIG. 2(d-1).

To attain the magnification ratio of 40%, the same manner for the ratio of 100% can be applied to pick up the image data, but the size of the input scanning beam must be "($\frac{1}{2}$)a (main scanning direction)×2a (sub-scanning direction)". In this case, image data for driving the recording beam can be obtained by averaging the image data corresponding to several scanning lines (in this case, four scanning lines), wherein every fifth scanning line of the input side is skipped over (FIG. 2(e-1)).

To attain the magnification ratio of 20%, the same manner for the ratio of 40% can be applied to pick up image data, but the size of the input scanning beam must be "($\frac{1}{2}$)a (main scanning direction)×4a (sub-scanning direction)". In this case, image data for driving the recording beam can be obtained by averaging the image data corresponding to several scanning lines (in this case, eight scanning lines), wherein every fifth scanning line of the input side is skiped over (FIG. 2(f-1)).

Therefore, feeding pitch of an input head in the sub-scanning direction can be variable according to the size of an input scanning beam i.e. a specified magnification ratio, while feeding pitch of a recording head can be in a step-like manner in the sub-scanning direction.

Although the explanations for FIG. 2 and subsequent drawings are based on the way of performing an image reproduction in desired magnification ratio by skipping over certain scanning lines of the input side, the method disclosed in U.S. Pat. No. 4,163,605 or in U.S. Ser. Nos. 933,714 or 170,127 can also be applied. The method discloses that image data stored in a memory are read in a skipped or in an overlapped fashion to record a reproduction image with magnification conversion. This kind of skipping or overlapping reading should be smoothed as well as possible by analysis of a CPU (Central Processing Unit).

The aforesaid skipping-over ratio of the input side with respect to each step of the magnification ratio is disclosed in said U.S. Ser. Nos. 933,714 and 170,127 as is shown in Table 1.

TABLE 1

| Magnification ratio | Input pixel number (n) | Thinning out ratio |
| --- | --- | --- |
| 200 to 101 | 200 | (200 − X)/200 |
| 100 to 51 | 100 | (100 − X)/100 |
| 50 to 26 | 50 | (50 − X)/50 |
| 25 to 12.5 | 25 | (25 − X)/25 |

Note:
n: The number of sub-scanning lines.
X: Magnification ratio (%)

Output pixels (2) shown in FIG. 2 can also be obtained by reading image data from a memory in a skipped or in an overlapped fashion of the addresses of the sub-scanning direction. In this case, magnification conversion of the main scanning direction is performed by using a method disclosed in U.S. Pat. No. 3,272,918 or in U.S. Ser. No. 924,928.

Figure 3:
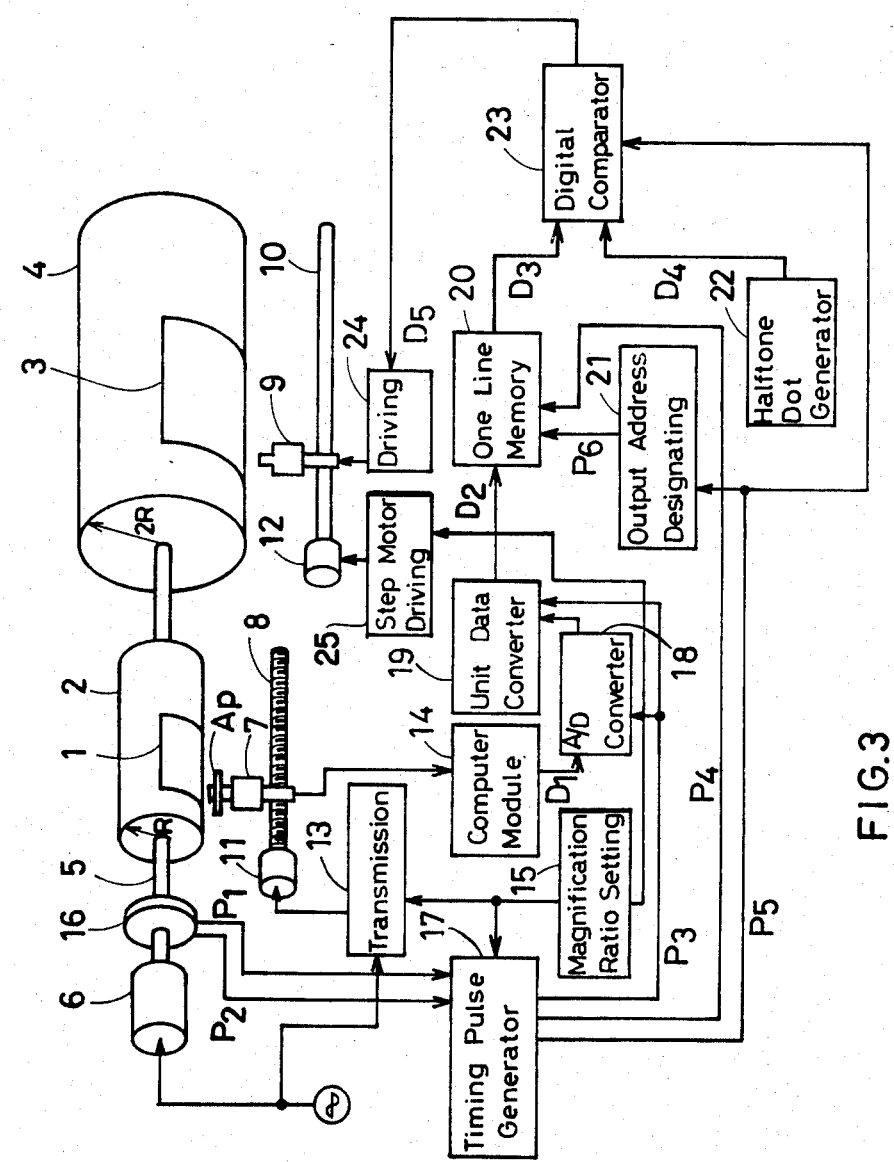
FIG. 3 shows an embodiment of a drum scanner to which the method of this invention is applied.

FIG. 3 is a block chart showing an embodiment of a drum scanner to obtain the output pixels (2) by using the method of this embodiment invention. In this, recording beam size is fixed on "a×a" and the frequency of a recording pulse (revolution frequency of a recording drum) is constant, while minimum scanning beam size of the input side is "($\frac{1}{2}$)a×($\frac{1}{2}$)a".

An original picture drum 2 on which an original picture 1 is placed and a recording drum 4 on which a photosensitive film 3 is placed are coaxially connected with an arbor 5 to the spindle of a synchronous motor 6 to be given a revolution power. In this, provided that the radius of the original picture drum 2 is R, the radius of the recording drum 4 is set up to be 2R. This is for attaining the maximum magnification ratio of 200% in the main scanning direction because the circumference speed of the recording drum 4 can be twice that of the original picture drum.

A scanning head 7 is provided on a feeding gear 8 to be fed along the original picture drum 2, while a recording head 9 is provided on a feeding gear 10 to be fed along the recording drum 4. The feeding gears 8 and 10 are driven by step motors 11 and 12 respectively. In this embodiment, the synchronous motor 11 is made to produce four-step feeding speed by using a transmission 13 according to the magnification ratio which ranges from 12.5% to 200%, and an aperture Ap having proper slit width in the sub-scanning direction is selected according to a specified feeding speed at the same time.

On the other hand, the step motor 12 is driven in a step-like manner in the sub-scanning direction according to the specified feeding speed (mentioned in detail later).

The scanning head 7, having a phototube and color separation filters etc., has a function to output R (Red), G (Green) and B (Blue) signals by receiving an image data of the original picture from a laser beam (the producer of the beam is not shown in the drawings). These color component signals are then input to a computer module 14 to produce color component data $D_1$ which have undergone necessary processes for a color scanner such as color and gradation correction.

Meanwhile, from a pulse encoder 16 which is coaxially connected or synchronously related to the original picture drum 2, one pulse $P_1$ which is a pulse generated every one revolution of the original picture drum 2 and a control pulse $P_2$ which is a pulse group obtained by dividing the one pulse at regular intervals are output. These pulses are input to a timing pulse generator 17 which outputs a sampling pulse $P_3$ corresponding to the beam size "($\frac{1}{2}$)a×($\frac{1}{2}$)a" of the input side, a reading pulse $P_4$ to read the picked-up and averaged image data, and a recording pulse $P_5$ correspoding to the beam size "a×a" of the output side are output.

Assuming that the frequency of the sampling pulse $P_3$ is $f_{in}$, the frequency of the reading pulse $P_4$ is $f_{in}/N$ (N is the averaging number), and the frequency of the recording pulse $P_5$ ($f_{out}$) is one second $f_{in}$ ($f_{out}=(\frac{1}{2})f_{in}$).

Said sampling pulse $P_3$ having the frequency of $f_{in}$ is input to an analog/digital converter 18 to be used for converting the image data $D_1$ output from said computer module 14 from analog form into digital form. The digitized image data are then input to a unit data converting circuit 19. When the magnification ratio is in the range of 101% to 200%, the digitized image data $D_1$ themselves are output from the unit data converting circuit 19. When the magnification ratio is in the range of from 12.5% to 100%, some out of the digitized image data are sampled and the sampled data are digitized according to a specified magnification ratio as shown in FIG. 2. The sampled and digitized (in other words, averaged) image data $D_2$ are then input to a one line memory 20.

In the meantime, a pulse is input from a magnification ratio setting circuit 15 to the transmission 13 to feed the input scanning head 7 in a step-like manner according to a specified magnification ratio. On the other hand, a control signal is input to a step motor driving circuit 25 to feed the step motor 12 according to the specified magnification ratio. The line data $D_2$ are read from the one line memory 20 on command of the reading pulse $P_4$, wherein one line data is thinned out according to Table 1 to attain the specified magnification ratio in the sub-scanning direction on command of an address control pulse $P_6$ being output from an output address designating circuit 21 by the control of said recording pulse $P_5$. For the main scanning direction factor, some of the data are thinned out when being read from the one line memory 20 by the address control pulse $P_6$ according to the specified magnification ratio.

Image data $D_3$ which have already undergone the magnification conversion are output from the one line memory 20 into a digital comparator 23 and then compared to a halftone dot pattern signal $D_4$ input from a halftone dot generator 22 to be halftone dot data $D_5$. These data $D_5$ are input through the driving circuit 24 into the exposing head 9 to drive a beam producer being built-in the exposing head 9. As a result, a color separaton helftone image is recorded in the specified magnification ratio.

In the embodiment shown in FIG. 3, magnification conversion of the main scanning direction is performed by thinning out certain image data obtained from the pixels of an original picture according to a specified magnification ratio as well as for the sub-scanning direction. Other from the abovementioned method and the methods disclosed in U.S. Pat. No. 4,163,605 and in U.S. Ser. Nos. 933,714 and 170,127, the method disclosed in U.S. Pat. No. 3,272,918 or U.S. Ser. No. 924,928 can be applied to this invention. That is, when the former method is adopted to be used, magnification conversion of the main scanning direction can be performed by using same scale drums as the original picture drum 2 and the recording drum 4, making both drums revolve in synchronization, fixing the frequency of the reading pulse for the one line memory 20 regardless of the magnification ratio, and varying the frequency of the writing pulse continuously. Of course magnification conversion of the sub-scanning direction can be performed by using the method of this invention.

When the latter method is adopted to be used, magnification conversion of the main scanning direction can be performed by using same scale drums as the original picture drum 2 and the recording drum 4, making the drums revolve in relation for performing a specified magnification ratio, and fixing the frequency of the reading and writing pulse for the one line memory 20 to be practically identical. In this, the line memory 20 is used as a kind of temporary memory for correcting the distortion of the image data. The method of this invention can be applied to a laser beam scanner as well as to said drum scanner.

Figure 4:
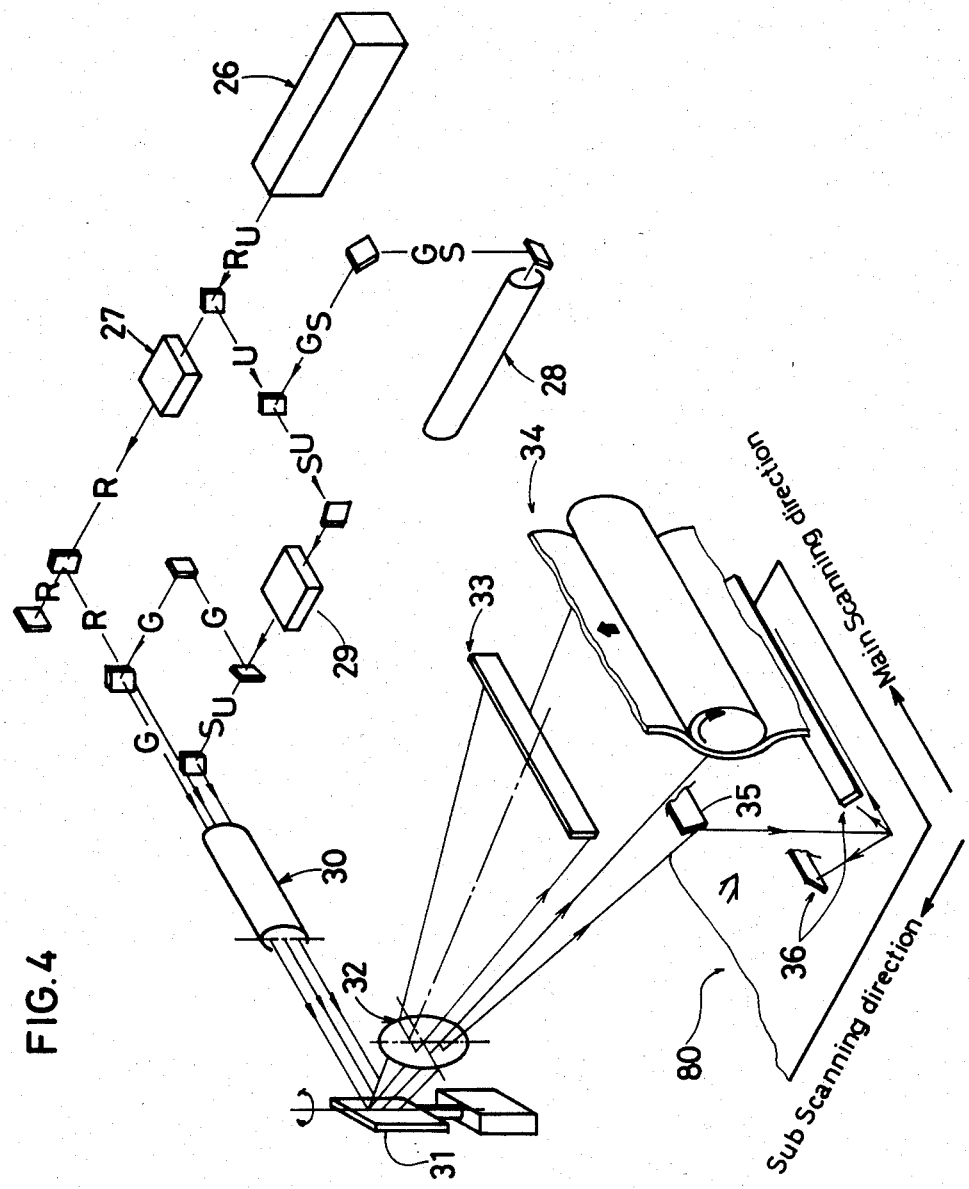
FIG. 4 is an example of an optical system of a laser beam scanner to which the method of this invention is applied.

FIG. 4 shows an embodiment of an optical system of a laser beam scanner to which the method of this invention is applied. In FIG. 4, laser beams for printing film from such as an $Ar^+$ laser beam producer and for scanning an original picture 80 from such as a He-Ne laser beam producer are brought to a laser beam modulator 27 and to a beam intensity controller 29 respectively via respective optical systems composed of such as half mirrors and mirrors. The beams from the laser beam modulator 27 and from the beam intensity controller 29 are synthesized into three beams by an optical system and then brought to a beam polarizer 31 such as a galvano mirror or a polygon mirror via a beam expander 30.

The three beams brought to the beam deflector 31 are composed of a recording beam, an optical grating scanning beam and an input scanning beam.

The recording beam is used for scanning in the main scanning direction a photosensitive film 34 being fed in the sub-scanning direction via an object lens 32 according to a specified magnification ratio.

The optical grating scanning beam is used for scanning a linear scale 33 consisting of an optical grating and a line sensor array as disclosed in U.S. Ser. No. 408,634 via the object lens 32. The linear scale 33 outputs a control signal to control timings for picking up image data by using the input scanning beam and for recording the photosensitive film by using the recording beam.

The input scanning beam is used for scanning in the main scanning direction the original picture 80 being fed in the sub-scanning direction via the object lens 32 and a mirror 35 being controlled by the deflector 31. The input scanning beam reflected on the original picture 80 is detected by line sensor arrays 36 equipped along the main scanning direction, from which line sensor arrays 36 an image data are output.

Figure 5:
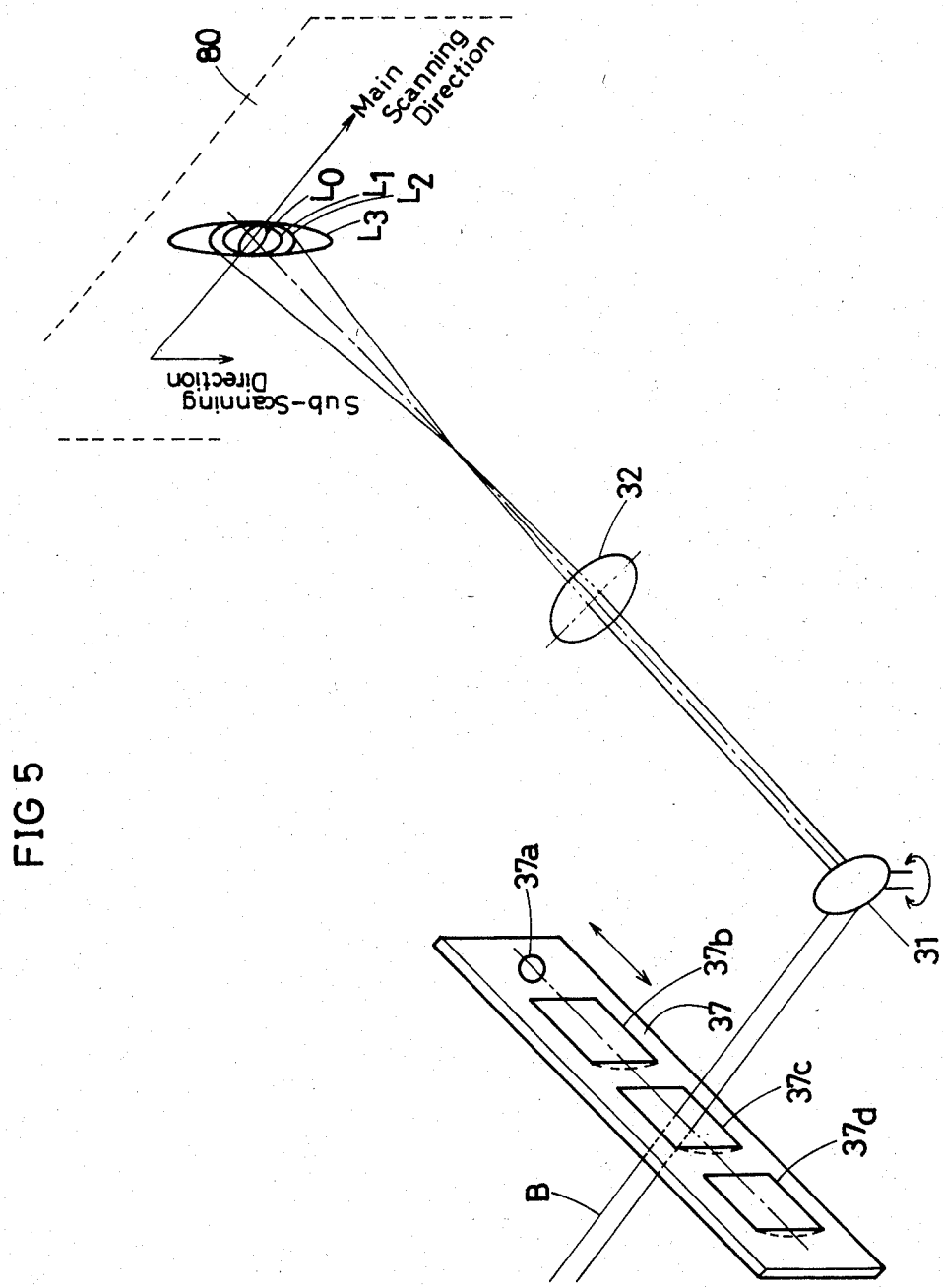
FIG. 5 is a part of the optical system shown in FIG. 4.

Incidentally, an aperture 37 is provided on the route of the input scanning beam B for changing the diameter of the input scanning beam B into $L_0$, $L_1$, $L_2$ or $L_3$ in the sub-scanning direction according to a specified magnification ratio as shown in FIG. 5 (not shown in FIG. 4). In FIG. 5, a desired diameter of the input scanning beam B of the sub-scanning direction can be obtained on the original picture 80 by selecting a through hole 37a or one of sylindrical lenses 37b, 37c and 37d optionally.

Figure 6:
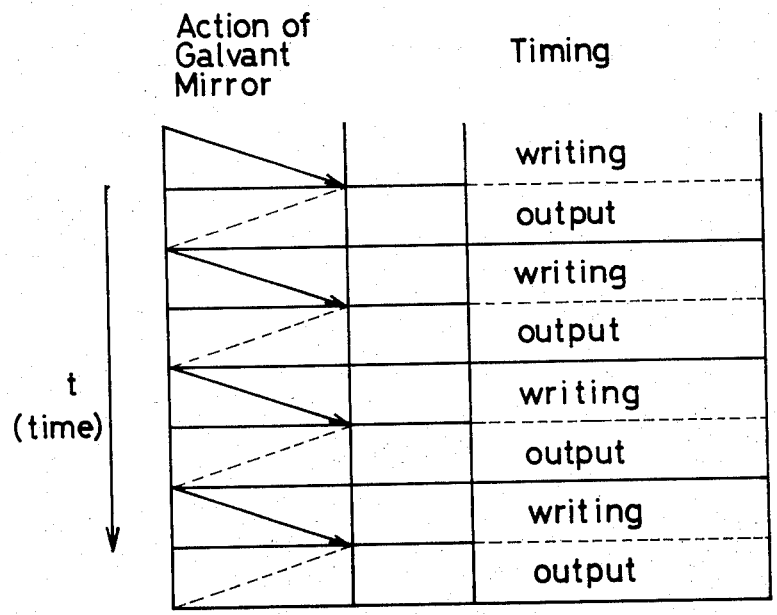
FIG. 6 is a timing chart of the operatin of the laser beam scanner shown in FIG. 4.

FIG. 6 is a timing chart of a laser beam scanning system using the method of this invention. The input scanning beam B is driven forward or backward alternately in the main scanning direction to scan the original picture 80 by being controlled by the deflector 31 (a galvano mirror). In the forward (scanning) time shown as solid arrows in FIG. 6, image data obtained from the original picture 80 are sampled and undergo color and gradation correction and averaged to be input to a memory, while in the backward time shown as broken arrows in FIG. 6, a reproduction image is recorded.

Figure 7:
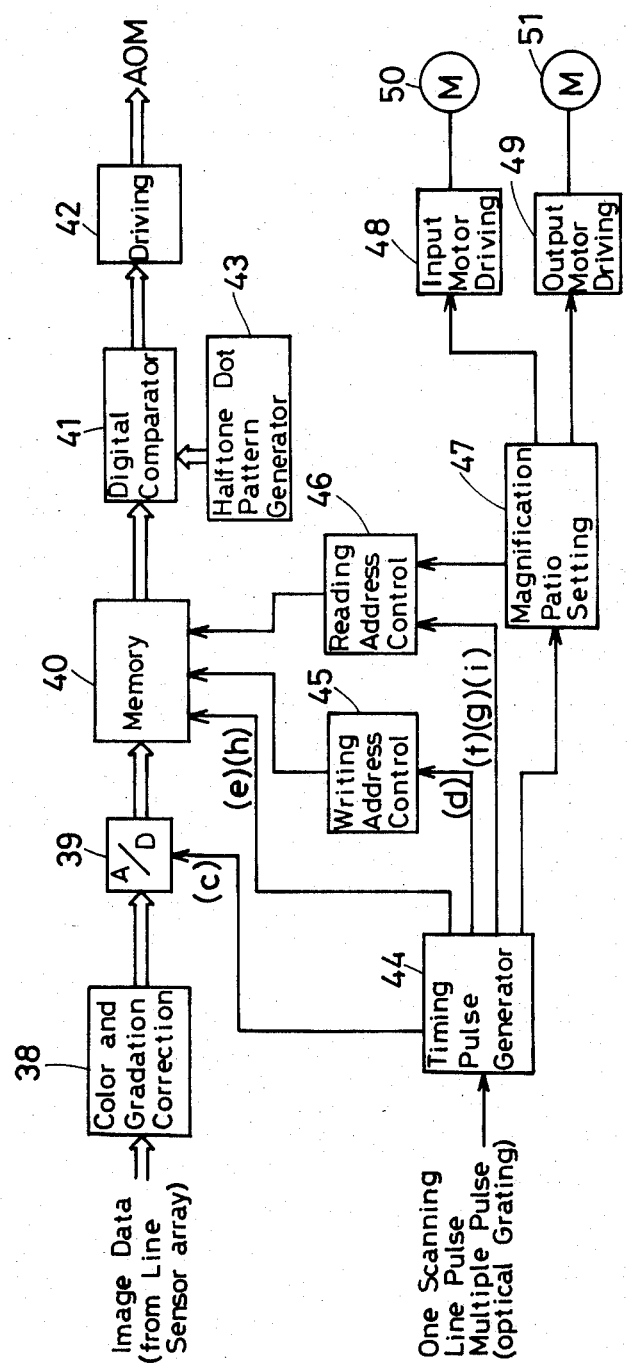
FIG. 7 is a block chart of a circuit for explaining conventional way of magnification conversion of the main scanning direction factor.

FIG. 7 shows an embodiment of a laser beam scanner, in which the method of this invention and the method of converting magnification ratio of main scanning direction disclosed in Japanese Patent Publication Nos. 53-11601, 54-35613 or 54-65601 are used. The image data detected by the line sensor array 36 are input to a color and gradation correction circuit 38 to undergo necessary processes. The image data for recording films output from the color and gradation correction circuit 38 are input to an analog/digital converter 39. In this converter 39, the image data undergoes sampling process on command of a pulse from a timing pulse generator 44 (mentioned later) and analog/digital conversion and are input to the addresses of a memory 40.

Then the image data are read from the memory 40 to produce a halftone dot signal by being compared to the halftone dot pattern signal from the halftone dot pattern generator 43 as shown in FIG. 3 in a digital comparator 41. By driving an acousto optic modulator (AOM) with this signal via a driving circuit 42, a halftone dot image is recorded in a desired magnification ratio by the recording beam which scans in the main scanning direction. Magnification conversion of the sub-scanning direction is performed by using the method of this invention, which has a functional step of varying the beam scale of the input side according to a specified magnification conversion ratio while varying the feeding speed of the input head, meanwhile fixing the beam scale of the output side to record a reproduced image by thinning out several input scanning lines in a step-like feeding.

Figure 8:
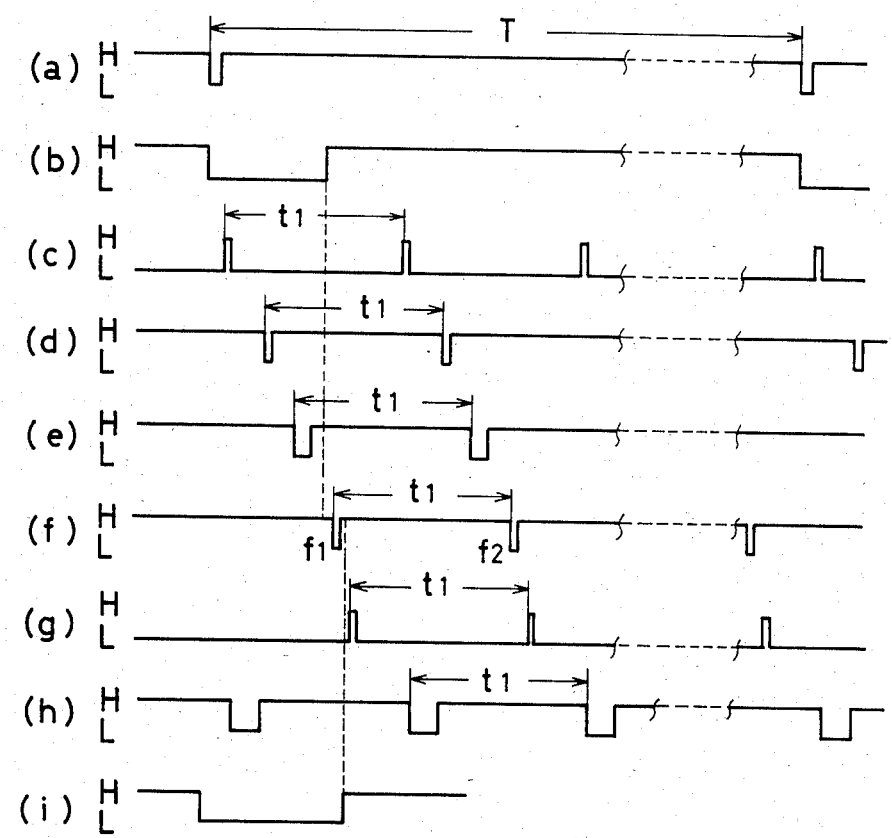
FIG. 8 is a timing chart of the operation of the circuit shown in FIG. 7.

On the other hand, magnification conversion for the main scanning direction is performed as follows. A timing pulse generator 44 generates plural control pulses using a one scanning line pulse and a multiple pulse. FIG. 8 shows a timing chart of the control pulses.

FIG. 8(a) shows a one scanning line pulse from the aperture wherein "T" is a one scanning cycle of the recording beam. FIG. 8(b) shows a pulse made by prolonging duration of the pulse in FIG. 8(a). FIG. 8(c) shows a clock pulse made by dividing the multiple pulse from the aperture in order to have a cycle of "$T_1$", which is used for performing sampling and analog/digital conversion in the analog/digital converter 39. FIG. 8(d) shows a command clock pulse for a writing address control circuit 45 having cycle of "$T_1$". FIG. 8(e) shows a writing clock pulse to write the image data from the analog/digital converter 39 into the addresses of the memory 40 designated by the writing address control circuit 45. FIG. 8(f) shows a designation clock pulse for a reading address control circuit 46. FIG. 8(g) shows a latch pulse for the reading address control circuit 46. FIG. 8(h) shows a reading clock pulse to be used for reading the image data from the memory 40. FIG. 8(i)

shows a clear or reset pulse made from the one scanning line pulse in FIG. 8(a).

Figure 9:
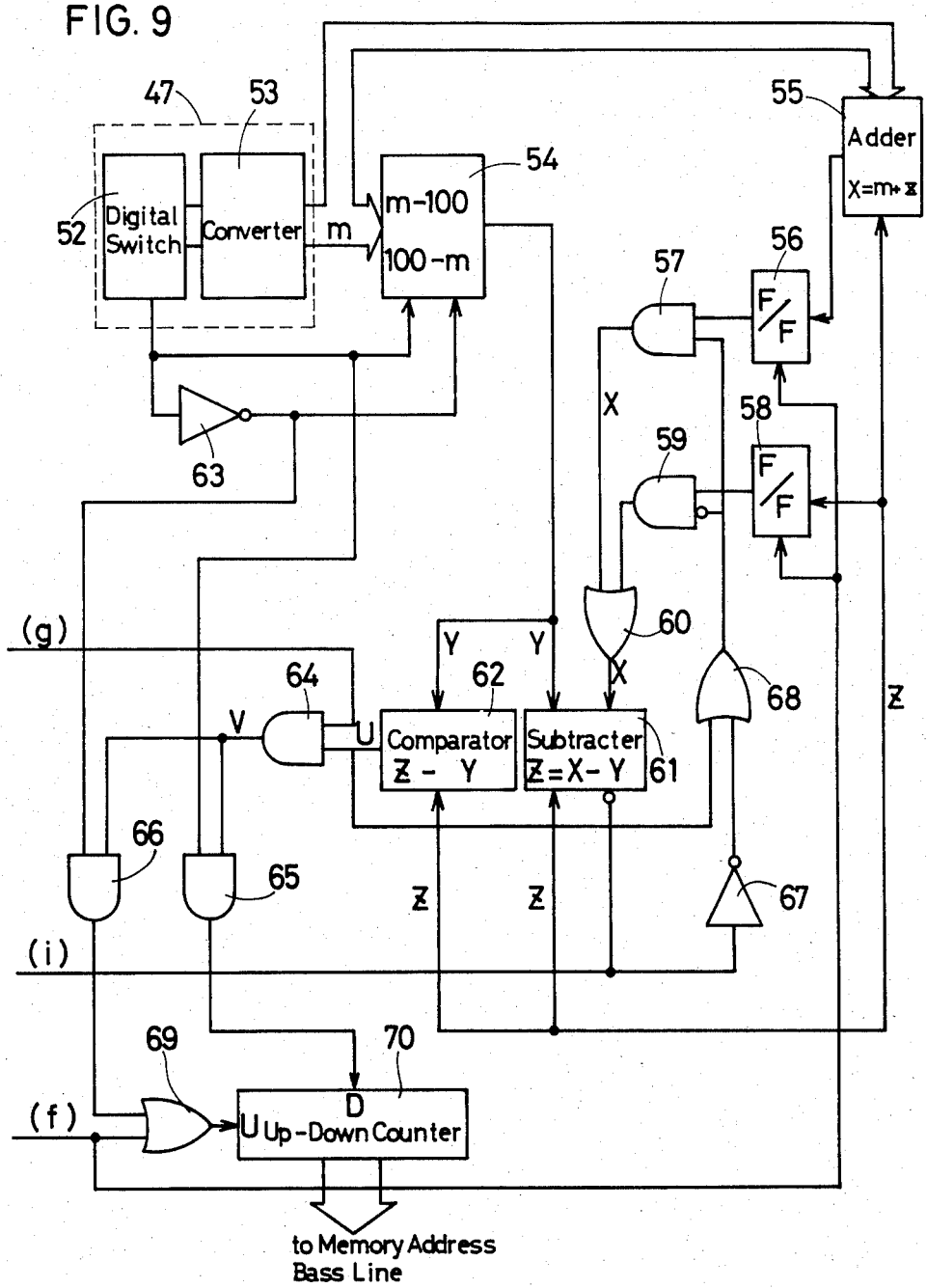
FIG. 9 is a circuit for reading image data from a memory in a skipped or in an overlapped fashion according to a specified magnification ratio.

FIG. 9 is an embodiment of a circuit which designates a proper reading method for the image data from the memory 40 from among several modes of skipped or overlapped fashion. In FIG. 9, the square enclosed by broken lines shows a magnification ratio setting circuit 47 also shown in FIG. 7 and the other part shows the reading address control circuit 46. As this kind of a circuit is disclosed in said U.S. Ser. No. 170,127 in detail, the present disclosure briefly describes only a case wherein the magnification ratio "m" is 150%. At first, a digital switch 52 is set up for the magnification ratio of 150%. As the hundreds digit of the magnification ratio m is "1", a subtraction "m−100" is performed in a subtractor 54. Consequently, a signal (Y) becomes "50" to attain a calculation m/m−100=3 which designates a way of reading every second scanning lines are to be overlapped.

A subtractor 61 is cleared by a clear pulse (i) to make the value of a signal (Z) become "0", while a reversed signal "H" of the clear pulse (i) is input to an AND-gate 57. Meanwhile, said magnification ratio m is input to an adder 55 to perform calculation "X=m+Z". In this case as the value X is zero, ratio data "X=150" is input to a flip-flop circuit 56 and is latched while a clock pulse (f) is "H".

When the first clock pulse ($f_1$) is input to an up-down counter 70, a counted number in said counter increases by one and the ratio data "X=150" latched on the flip-flop circuit 56 is input to a subtractor 61 via an AND-gate 57 and an OR-gate 60. In the up-down counter 70, a subtraction "X−Y" is performed, and a signal Z (Z=100 in this case) is output. This value "Z=100" is compared to the value Y to perform a calculation "Z−Y". In this case, the value "Z−Y" is "50" being greater than zero which leads to make the output valve (u) of the comparator 62 becomes "L". This output value (u) is input to the AND-gate 57 and to an AND-gate 59 via an OR-gate 68. Therefore, the AND-gate 57 is closed and the AND-gate 59 is opened, consequently the data "Z=100" is input to te flip-flop circuit 58 and latched on it while the clock pulse (f) is "H".

As the output value (u) of the comparator 62 is "L" in this case, a latching pulse (g) is halted in the AND-gate 64 naturally leading to keeping of the value counted in the up-down counter 70 on the condition determined by the clock pulse ($f_1$). Then reading address of the image data from the memory 40 is advanced by one on command of a clock pulse (h), which address is assumed "$S_1$".

When the second clock pulse ($f_2$) is input to the up-down counter 70, the value signal "Z=100" latched on the flip-flop circuit 58 is input to the subtractor 61 via the AND-gate 59 and the OR-gate 60 as a value "X". In the subtractor 61, the subtraction "X−Y" is performed to output the signal Z (Z=50 in this case) and is output to the comparator 62 and to the flip-flop circuit 59. As the value "X−Y" in the comparator 62 is "0", the output value (u) becomes "H" to open the AND-gate 57 and to close the AND-gate 59. And when a latch pulse (g) is input to an AND-gate 64, the AND-gate 64 outputs an address correction signal (V).

The address correction signal (V) reduces the number counted in the up-down counter 70 to neglect an increase by the act of the clock pulse ($f_2$) via the AND-gate 65 which opens when the hundreds digit set on the digital switch 52 is greater than "1". Therefore the reading address doesn't advance, in other words, the same address "$S_1$" is read again.

When the third clock pulse ($f_3$) is input to the up-down counter 70, the value "X=200" latched on the flip-flop circuit 56 made from an addition "m(150)+Z(50)" is input to the subtractor 61 to perform a calculation "X(200)−Y(50)=Z(150)". In this case, the output value (u) from the comparator 62 becomes "L". Meanwhile the number counted in the up-down counter 70 is increased by one on command of the clock pulse ($f_3$) to read the next reading address "$S_2$" of the image data. When the fourth clock pulse ($f_4$) is input to the up-down counter 70, the value "X" becomes "150", which means the circuit condition returns to the stage as same as the clock pulse ($f_1$) is input to the up-down counter 70. So by repeating aforesaid process, a reproduced image is obtained in the magnification ratio of 150%.

The abovementioned is an explanation of a drum scanner or a laser beam scanner to which the method of this invention is applied. As can be understood by that, the method of this invention is a new one being appropriate for the both scanners. Incidentally, when a film is recorded by merely using image data being performed a skipped or overlapped process in the main scanning direction or in the sub-scanning direction as shown in FIG. 3, sometimes the recorded image shows step-like continuity between its adjacent pixels which results in an unnatural reproduced image.

Figure 10:
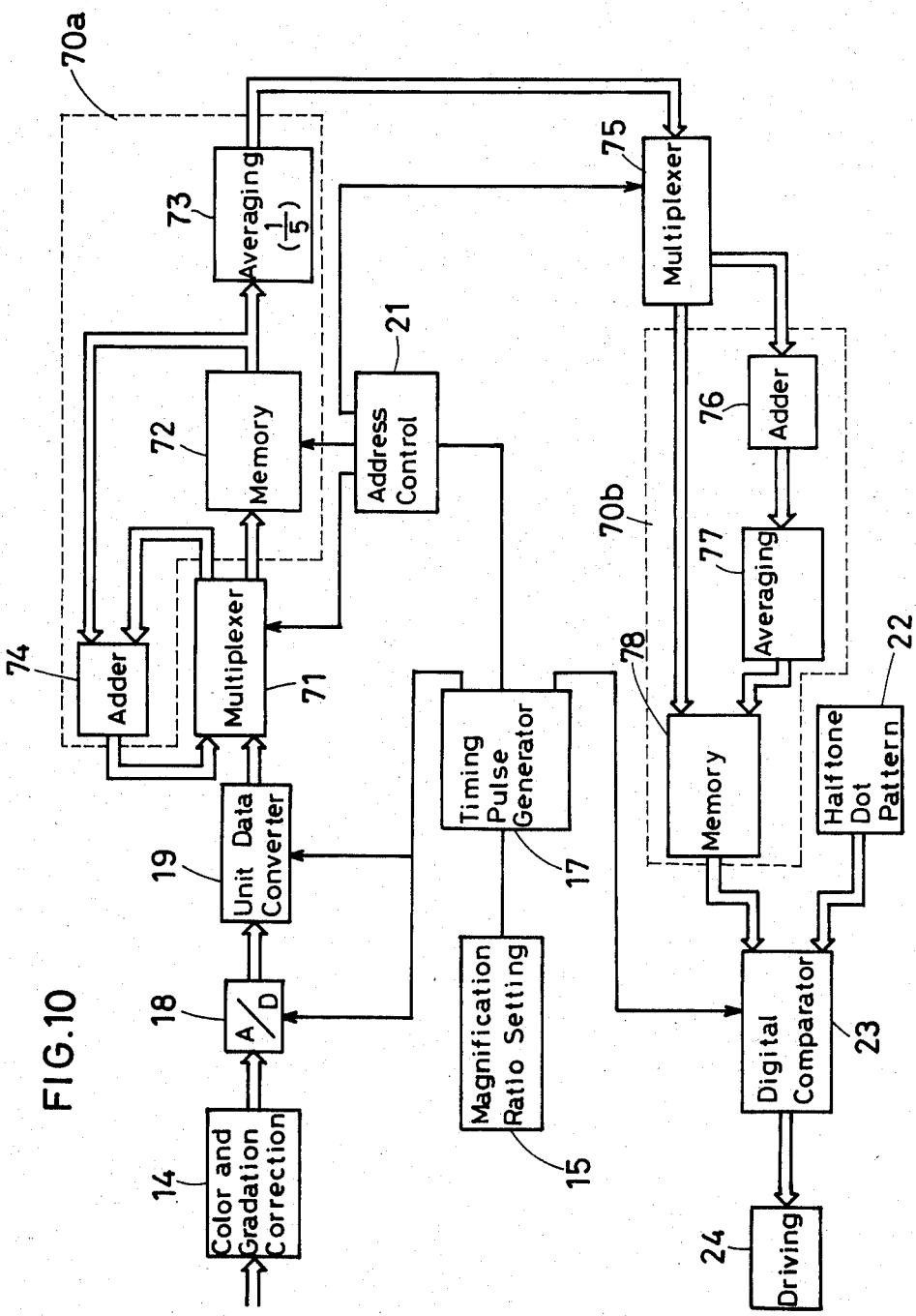
FIG. 10 is a block chart of an embodiment of an interpolating circuit for interpolating image data to be skipped over.

Therefore, interpolation circuits 70a and 70b had better be provided in the main scanning direction and in the sub-scanning direction as shown in FIG. 10 to perform a smoothing procedure on the step-like image data.

That is, unit data $D_{21}$ output from a unit data converter 19 are stored into a sub-scanning interpolation memory 72. When the unit data $D_{21}$ are not unit data which should be thinned out, the unit data are input to a multiplexer 75 via an averaging circuit 73. In other words, said unit data $D_{21}$ go through the averaging circuit 73.

Then the next unit data $D_{22}$ are data which should be thinned out, the unit data $D_{22}$ are read from the sub-scanning interpolation memory 72 to an adder 74. Then the unit data $D_{22}$ are mixed with the next unit data $D_{23}$ (not thinned out) input via a multiplexer 71 and are input to the memory 72 via the multiplexer 71 again. And the mixed data are divided by two (S=2) and are output instead of said unit data $D_{23}$. When the next unit data $D_{24}$ (these data should not be thinned out) are input, the unit data $D_{24}$ go through the averaging circuit 73 as well as the line data $D_{21}$.

Assuming that the image data of consequent two units are to be thinned out, an averaged data made by dividing by four (S=4) the mixed data of said two units data and either the next two units data or the unit data in front and in rear (these line data are not thinned out) of said two units data can be output from the averaging circuit 73.

These line data undergo interpolation of the sub-scanning direction in the above way, and are input to the main scanning interpolation circuit 70b to undergo interpolation of the main scanning direction as of the sub-scanning direction. That is, unit data $D'_{21}$ which should not be thinned out are input to a memory 78 via the multiplexer 75, while unit data $D'_{22}$ which should be thinned out are input to an adder 76 via a multiplexer 75, and are mixed with the unit data D′23 (being not thinned out) and are averaged to be input to the memory 78. In this, a determination whether a data should be thinned out or should not be thinned out is made by a signal from an address control circuit 21.

The following is an explanation for the case of obtaining the output pixels (2) shown in FIG. 2 by scanning an original picture in a skipped fashion which is attained by the movement of an input scanning head. In the following explanation, magnification conversion of the main scanning direction is attained by using a method disclosed in U.S. Ser. No. 924,928 or a method disclosed in U.S. Pat. No. 3,272,918 and magnification ratio of the sub-scanning direction is exemplified in four cases.

FIG. 2(b-2) shows a case wherein the magnification ratio M is 150%. This magnification ratio can be attained by using a scanning head of which the scanning beam has a size of "($\frac{1}{2}$)a" in the main scanning direction by "($\frac{1}{2}$)a" in the sub-scanning direction, and by sampling an image data by a step corresponding to the pitch "($\frac{1}{2}$)a" in the main scanning direction and feeding the input scanning head by the step of "($\frac{1}{2}$)a" or "a" in the sub-scanning direction.

That is, the feeding pitch "($\frac{1}{2}$)a" is adopted for in between the scanning lines 1, 2, and 3, and the feeding pitch "a" is adopted for in between the scanning lines 3 and 4 because the scanning line 4 must be skipped over according to the magnification ratio. Therefore the scanning line 5 is scanned after the scanning line 3.

By thus obtained image data, a recording beam of which beam size is "($\frac{1}{2}$)a" in the main scanning direction by "a" in the sub-scanning direction is controlled. In this case the recording beam or a photosensitive film is fed by the step of "a" in the sub-scanning direction to record a reproduction image in a desired magnification ratio of the sub-scanning direction.

The scale of the recording pixels in the main scanning direction varies according to a specified magnification ratio, this point is mentioned later with a way of magnification conversion of the main scanning direction.

FIG. 2(d-2) shows a case wherein the magnification ratio M is 80%. This magnification ratio can be attained by using a scanning head of which scanning beam has a size of "($\frac{1}{2}$)a" in the main scanning direction by "($\frac{1}{2}$)a" in the sub-scanning direction, and by sampling an image data by a step corresponding to the pitch "($\frac{1}{2}$)a" in the main scanning direction and feeding the input scanning head by the pitch of "a" or "2a" in the sub-scanning direction.

That is, the feeding pitch "a" is adopted for in between the scanning lines 1, 2, 3 and 4, and the feeding pitch "2a" is adopted for in between the scanning lines 4 and 5 because the scanning line 5 must be skipped over in order to perform the magnification ratio.

FIG. 2(e-2) shows a case wherein the magnification ratio M is 40%. This magnification ratio can be attained by using a scanning head of which scanning beam has a size of "($\frac{1}{2}$)a" in the main scanning direction by "2a" in the sub-scanning direction, and by sampling an image data by a step corresponding to the pitch "($\frac{1}{2}$)a" in the main scanning direction and feeding the input scanning head by the pitch of "($\frac{1}{2}$)a" or "4a" (every fifth line) in the sub-scanning direction.

FIG. 2(f-2) shows a case wherein the magnification ratio M is 20%. This magnification ratio can be attained by using a scanning head of which scanning beam has a size of "($\frac{1}{2}$)a" in the main scanning direction by "4a" in the sub-scanning direction, and by sampling an image data by a step corresponding to the pitch "($\frac{1}{2}$)a" in the main scanning direction and feeding the input scanning beam by the pitch of "4a" or "8a" (every fifth line) in the sub-scanning direction.

In these three cases shown in FIGS. 2(d-2), (e-2) and (f-2), the recording beam having a beam size of "($\frac{1}{2}$)a" in the main scanning direction by "a" in the sub-scanning direction is controlled by the image data obtained in said manner. In this case the recording beam or a photosensitive film is fed by the step of "a" in the sub-scanning direction to record a reproduced image in a desired magnification ratio of the sub-scanning direction.

Though these are the method of performing magnification conversion by skipping over certain scanning lines of the input side, the magnification conversion can also be attained by writing image data of an original picture into a memory in a skipped or in an overlapped fashion in the main and sub-scanning direction.

To vary the size of an input beam in the sub-scanning direction, the embodiment shown in FIG. 5 can be used.

FIG. 11 shows a timing chart of a relation of between several magnification ratios and a control signal for a step motor which is used as a means for feeding the input scanning beam.

FIG. 11(a) shows a synchronizing signal ($S_1$) which is for example obtained from a galvano mirror driving circuit of a laser beam scanner using a galvano mirror as a beam deflecting means. The synchronizing signal ($S_1$) has duration "H" for forward ways (scanning time of an original picture) and a duration "L" for backward ways (recording time).

FIGS. 11($b_1$) to ($b_6$) shows clock pulses corresponding to the magnification ratios of 150% (the beam size of the sub-scanning direction is "($\frac{1}{2}$)a"), 80% (said size is "a"), 60% (said size is "a"), 40% (said size is "2a"), 30% (said size is "2a") and 20% (said size is "4a") respectively for feeding the step motor.

When the magnification ratio of 150% is to be performed, the size of the input beam in the sub-scanning direction must be "($\frac{1}{2}$)a". For scanning the scanning lines 1, 2 and 3, the step motor is driven on order of the synchronizing signal S, shown in FIG. 11(a), which feeds the original picture or the input scanning beam by the pitch of "($\frac{1}{2}$)a" in the sub-scanning direction. The next scanning line 4 is to be skipped over as shown in FIG. 2(a), the original picture or the input scanning beam must be fed by the pitch of "($\frac{1}{2}$)a×2=a" in the sub-scanning direction before the scanning of the scanning line 5.

For scanning the scanning lines 6 and 7, the step motor is driven on order of the synchronizing signal $S_1$, which feeds the original picture or the input scanning beam by the pitch of "($\frac{1}{2}$)a" in the sub-scanning direction as well as for said scanning lines 1, 2 and 3. The next scanning line 8 is to be thinned out, the original picture or the input scanning beam must be fed by the pitch of "($\frac{1}{2}$)a×2=a" in the sub-scanning direction before the scanning of the scanning line 8. Likewise the original picture or the input scanning beam is fed by the pitch of "($\frac{1}{2}$)a×2=a" in the sub-scanning direction in every fourth scanning line.

For performing the magnification ratio shown in FIGS. 11($b_2$) to ($b_6$), basically the similar method mentioned above can be adopted wherein only the feeding pitch and the scanning lines which must be skipped over differ case by case. So no explanation for them is mentioned here.

Figure 12:
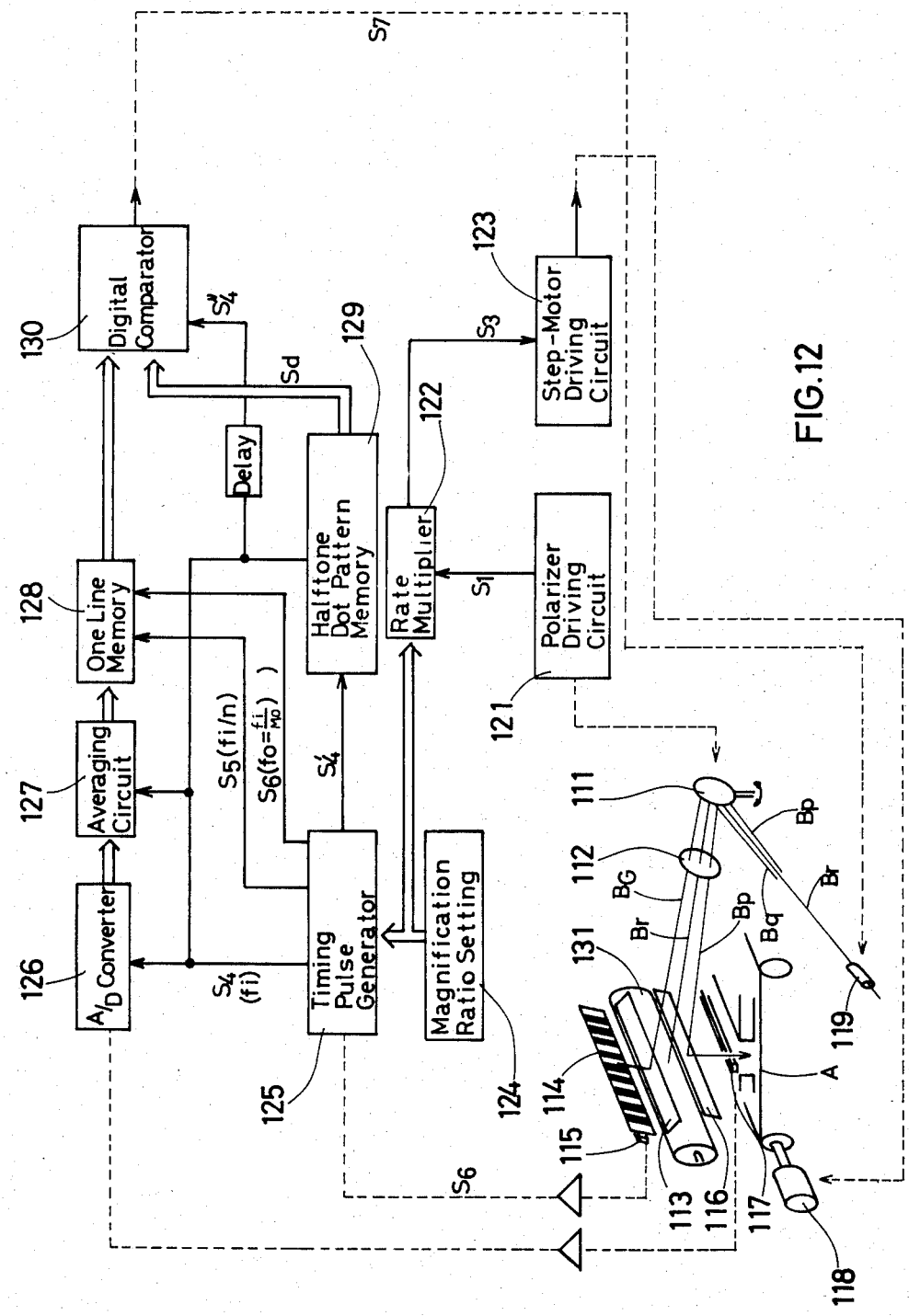
FIG. 12 is a block chart of an example of a laser beam scanner to which the method of this invention is applied.

FIG. 12 shows an embodiment of a laser beam scanner to which the method of this invention is applied. FIG. 13 is a timing chart of the operation of the laser beam scanner shown in FIG. 12 of the main scanning direction factor.

A beam deflector 111 is controlled by a deflector driving circuit 121 using the synchronizing signal $S_1$ shown in FIG. 11(a) in certain cycle. The input scanning beam Bp deflected by the beam deflector 111 scans the original picture A fed in the sub-scanning direction by a step motor 118 toward the main scanning direction via an object lens 112 and a mirror 116. On the other hand the synchronizing signal $S_1$ from said driving circuit 121 is input to a rate multiplier 122. This rate multiplier 122 determines certain scanning lines to be skipped over according to a specified magnification ratio being set in the magnification ratio setting circuit 124 as shown in FIG. 2 and in FIG. 11, and outputs a step motor driving signal $S_3$ as shown in several conditions in FIGS. 11($b_2$) to ($b_6$) to a step motor driving circuit 123 to drive a step motor 118.

Figure 14:
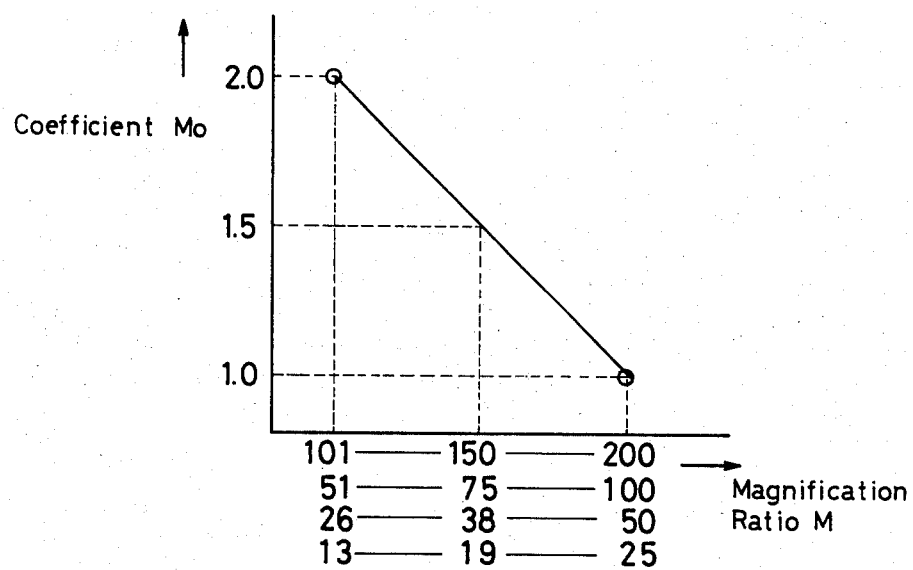
FIG. 14 is a graph showing a relation of between magnification ratio M and a corresponding coefficient.
Figure 15A:
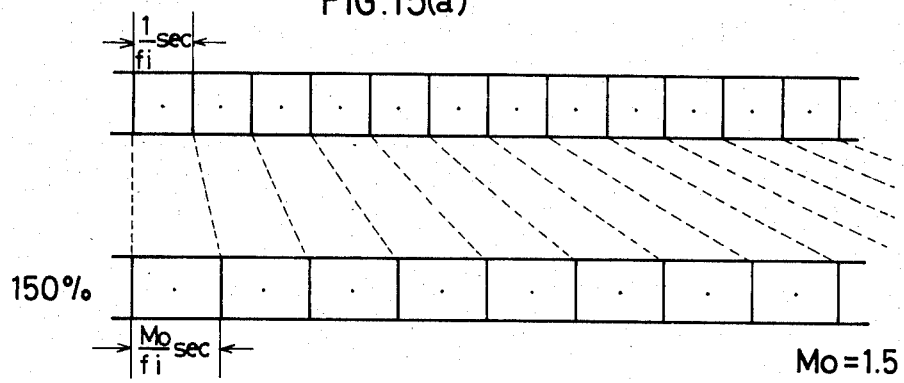
FIG. 15 shows a relation of between a sampling clock and a reading pulse.
Figure 15B:
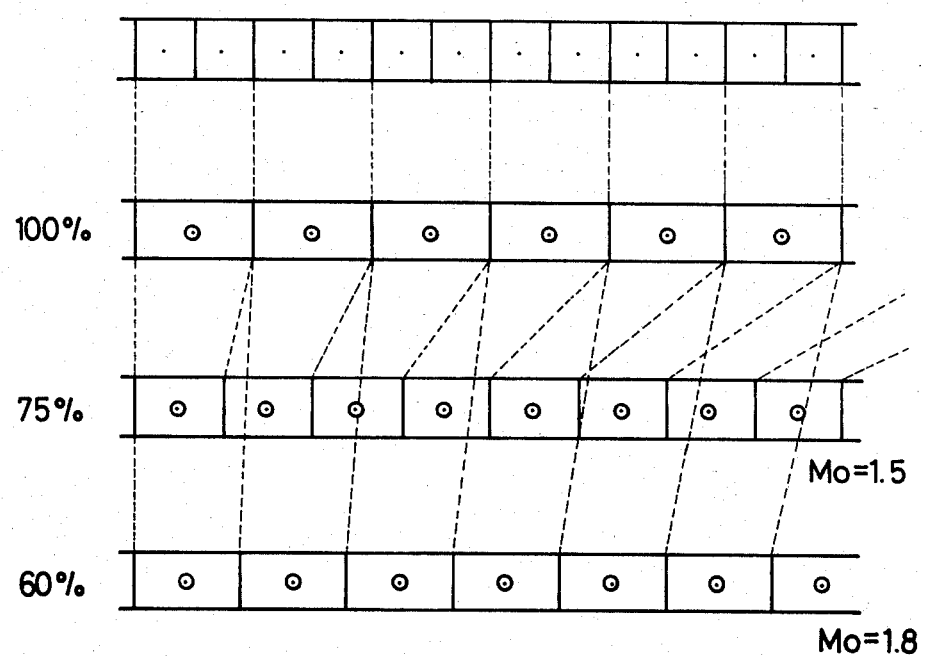
Figure 15C:
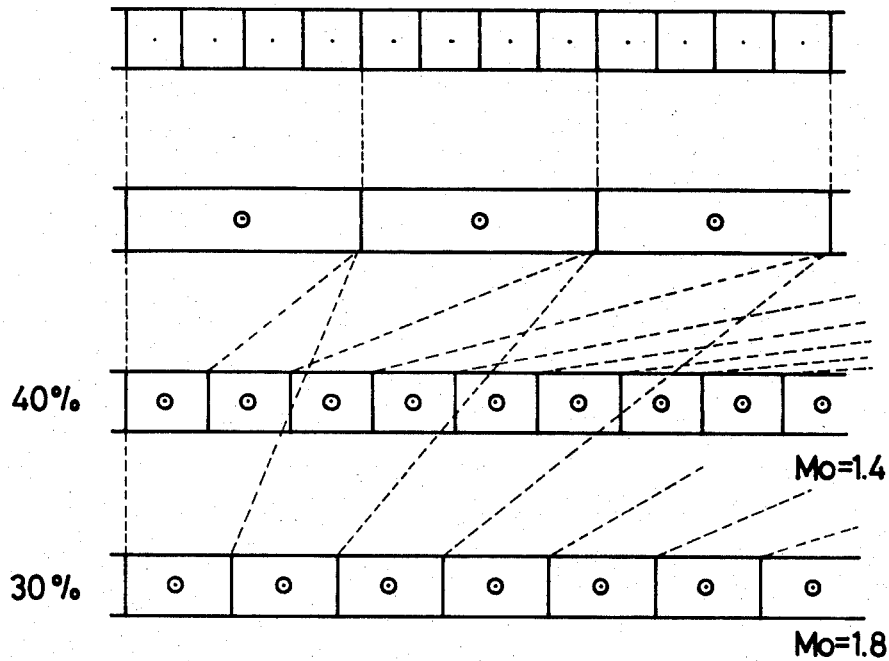
Figure 15D:
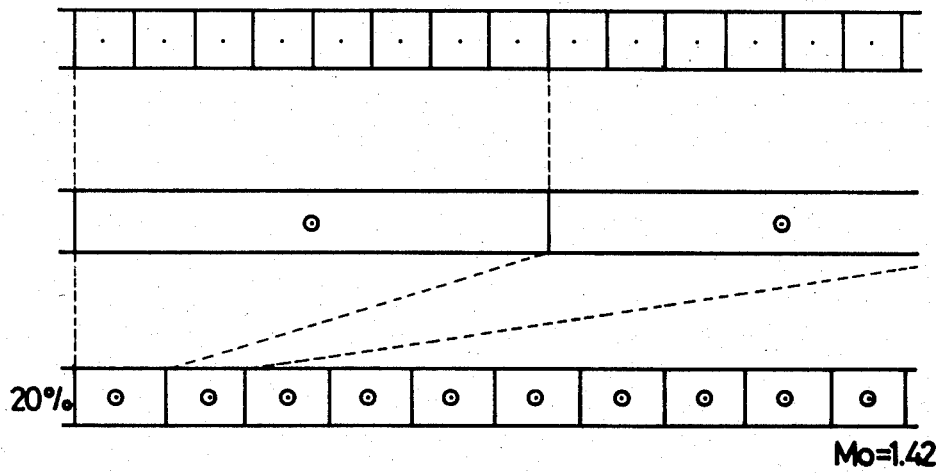

Meanwhile, a grating beam $B_G$ deflected by the beam deflector 111 such as a galvano mirror scans an optical grating 114 in the main scanning direction synchronizing with the input scanning beam $B_P$ via the object lens 112 and the mirror 113. As a result, a grating signal $S_G$ is obtained in a line sensor array 115 provided beyond the optical grating 114, and is input to a timing pulse generator 125. From the timing pulse generator 125, a sampling clock $S_4$ (having frequency $f_i$) as shown in FIG. 13(b), a writing pulse $S_5$ as shown in several condition corresponding to the magnification ratios in FIGS. 13(c), (d), (e) and (f), a dot pattern reading clock $S'_4$ having the same cycle of the sampling clock $S_4$ as shown in FIG. 13(g), a memory reading pulse $S_6$ having a frequency corresponding to the magnification ratio as shown as an example in FIG. 13(h) are output. Regarding the memory reading pulse $S_6$, its frequency $f_0$ is $f_i/M_0$ wherein $M_0$ is a coefficient determined by the magnification ratio M as shown in FIG. 14 having a range $1 \leq M_0 \leq 2$.

A beam reflected at the surface of the original picture A of the input scanning beam Bp is collected by a line sensor 117 provided against the original picture A. And the line sensor 117 converts the collected beam into a electrical signal as shown in FIG. 13(a) and outputs it into an analog/digital converter 126. The analog/digital converter 126 converts said image data from analog form into digital form in a timing of the sampling clock $S_4$ (this clock $S_4$ corresponds to the width "(½)a" of the input scanning beam of the main scanning direction) which is input from said timing pulse generator 125.

The image data which underwent the analog/digital conversion in the analog/digital converter 126 are then input to an averaging circuit 127 to be averaged in a timing corresponding to a selected width out of "(½)a", "a", "2a" and "4a" of the input scanning beam of the sub-scanning direction, in other words, corresponding to a specified magnification ratio.

When the magnification ratio is from 101% to 200% (enlargement), the image data which underwent the analog/digital conversion according to the sampling clock $S_4$ are written into a one line memory 128 according to the sampling clock $S_4$ as shown in FIG. 6($b_2$) via the averaging circuit 127.

When the magnification ratio is from 51% to 100% (reduction), the image data which underwent the analog/digital conversion according to the sampling clock $S_4$ are averaged in the averaging circuit 127, in which image data, data corresponding to every two consecutive pixels are averaged, and the averaged data are written into the one line memory 128 according to the timing corresponding to two pulses of the sampling clock $S_4$.

When the magnification ratio is from 26% to 50% (reduction), the image data which underwent the analog/digital conversion according to the sampling clock $S_4$ are averaged in the averaging circuit 127, in which image data, data corresponding to every four consecutive pixels are averaged, and the averaged data are written into the one line memory 128 according to the timing corresponding to four pulses of the sampling clock $S_4$.

When the magnification ratio is from 12.5% to 25% (contraction), the image data wich underwent the analog/digital conversion according to the averaging circuit 127, in which image data, data corresponding to to every eight consecutive pixels are averaged, and the averaged data are written into the one line memory 128 according to the timing corresponding to eight pulses of the sampling clock $S_4$.

Then the image data are read from the line memory 128 according to a reading pulse $S_6$ corresponding to a specified magnification ratio. This reading pulse $S_6$ has a frequency $f_0 = f_i/M_0$, so when the magnification ratio is 150%, $M_0$ is 15/10 (=1.5). Thus read image data are compared in a digital comparator 30 to a dot pattern signal Sd read from a dot pattern memory 129 according to a clock signal $S''_4$ having the same frequency of the sampling clock $S_4$ as shown in FIG. 13(i) to be a recording signal $S_7$. This recording signal $S_7$ is used for controlling an acousto optic modulator (AOM) 119 which emits a beam Br to scan a phtosensitive material placed on a recording drum 31 via a beam deflector 111 and the object lens 112 recording a halftone image in a specified magnification ratio as a result.

FIG. 15 shows a typical timing of the scanning of the original picture according to the sampling clock $S_4$ (FIG. 13(b)) from the timing pulse generator 125 and a timing of the reading of the image data from the one line memory 128 when the magnification ratio is varied of the main scanning direction factor. When an enlarged image must be reproduced for example by the magnification ratio of 150% as shown in FIG. 15(a), the picked-up image data are directly written into the one line memory 128 and are read from the one line memory 128 in conformity with the magnification ratio. On the other hand, when a contracted image must be reproduced for example by the magnification ratio as shown in FIGS. 15(b), (c) and (d), the picked-up image data are averaged according to every two, four or eight pulses of the sampling clock $S_4$ respectively in the averaging circuit 127 and are written into the one line memory 128 and then are read according to the timing of $M_0/f_i$ corresponding to each magnification ratio. In FIG. 15 the mark ⊙ means the averaged data from among the image data shown as the mark.

As mentioned above, when the input scanning beam is fed in the sub-scanning direction in a step-like manner, certain scanning lines are skipped over (when the magnification ratio is 150%, every fourth scanning line is skipped over), consequently the skipped-over scanning lines are to be ignored.

Figure 16:
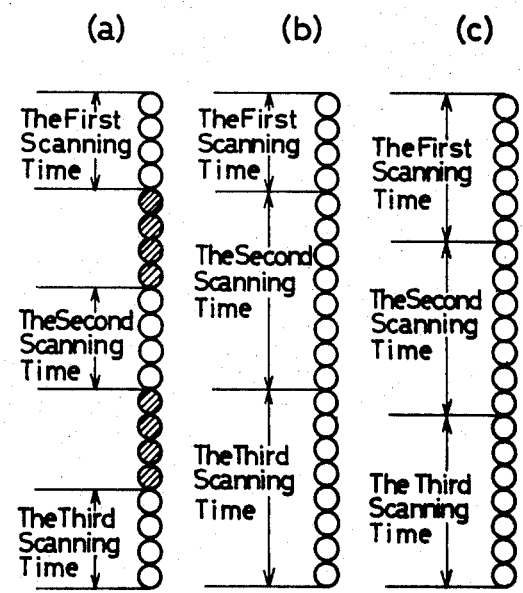
FIG. 16 shows a scanning method using a multi-beam.

FIG. 16 shows a means to resolve the abovementioned problem, wherein the minimum size "(½)a" of the input scanning beam of the sub-scanning direction is composed of multiple thin beams.

When no procedure is done for saving image data corresponding to the skipped-over scanning lines, every second scanning line is thinned out as shown as hatched circles in FIG. 16(a).

To save image data corresponding to these skipped-over scanning lines, eight thin beams are provided as the input scanning beam in the sub-scanning direction. By using thus constructed beam, the scanning after the second time is done in the double feeding pitch of the ordinary scanning pitch in the sub-scanning direction. Of course this scanning can be done from the first scanning line. As another way, twenty scanning lines are scanned by six thin beams and seven thin beams in three times as shown in FIG. 16(c). By using these methods, image data corresponding to to-be-skipped-over scanning lines are saved and become valid in the final image data by being mixed with regular image data.

FIG. 17 shows an optical system in which a multiple beam are employed as an input scanning beam. In the system, a laser beam $B_0$ are expanded by a beam expander 141 and is transformed into a beam which is plane in the sub-scanning direction to be put into a multi-channel beam modulator 143. This multi-channel beam modulator is composed of a multiple supersonic vibrator on a sole acousto optical material as disclosed in U.S. Ser. No. 395,436 now U.S. Pat. No. 4,506,275. The multiple beam from the multi-channel beam modulator 143 is put into a beam deflector 145 such as a galvano mirror through the slit 144. The multiple beam from the beam deflector is focused on an original picture A in a contracted scale also consisting of thin beams as memtioned before. In this, the number of the thin beams can be varied by the beam modulator 143.

The abovementioned embodiment has a method of performing magnification conversion in the main scanning direction at first by writing image data in a certain timing into a memory and then by reading the image data in a timing corresponding to a specified magnification ratio, while the same result can be attained by using the methods disclosed in U.S. Pat. Nos. 3,272,918 and 4,163,605 and in U.S. Ser. Nos. 924,928, 933,714, and 170,127.

In addition, although the abovementioned embodiment is explained for a laser beam scanner, the method of this invention can also be applied to a drum scanner.

As is mentioned above, the method of this invention is to perform magnification conversion of the sub-scanning direction factor by fixing the size of a recording beam and feeding pitch of a photosensitive material (a recording beam) in the sub-scanning direction, varying the size of an input beam in a step-like manner in the sub-scanning direction according to a specified magnification ratio and feeding (scanning in a skipped fashion) the original picture (the input scanning beam) in a step-like manner in the sub-scanning direction according to the specified magnification ratio. So unlike a conventional means of this kind of system which employs an expensive servomotor for performing high fidility feeding of an original picture (an input scanning beam) of the sub-scanning direction, an inexpensive step-motor can be used to attain a simplified and economical system for feeding in the sub-scanning direction.

When a reproduction image must be reduced, certain scanning lines are skipped over according to a specified magnification ratio, but the skipping-over ratio will not be above 50% since the size of an input scanning beam is varied in the sub-scanning direction according to several ranges of the magnification ratio, which results in killing influence of the scanning in a skipped fashion. Moreover, when magnification conversion of the main scanning direction must be performed, the above-mentioned embodiment adopts a method of submitting a sampling frequency of the input scanning to the maximum magnification ratio and keeping the frequency of a reading pulse of the image data from a memory above 50% of that of the sampling pulse, which results in reducing frequency range of a PLL circuit for generating the reading pulse synchronizing with the sampling pulse. This also permits the PLL circuit to be cheaper and to be stable.

We claim:

1. A method for performing magnification conversion in an image reproducing system, in which image data obtained by scanning an original picture in main and sub-scanning directions are written into a plurality of memory locations identified by a plurality of addresses and the image data are used for driving a recording beam in order to record a reproduction image, comprising the steps of:
   (a) varying a feeding pitch of an input scanning beam in the sub-scanning direction in steps according to a specified magnification ratio;
   (b) reading the image data from the memory locations;
   (c) skipping or overlapping some of the addresses of the memory locations according to the specified magnification ratio; and
   (d) varying the size of the input scanning beam in steps at least in the sub-scanning direction according to the specified magnification ratio.

2. A method for performing magnification conversion in an image reproducing system, in which image data obtained by scanning an original picture in main and sub-scanning directions are written into a plurality of memory locations identified by a plurality of addresses and the image data are used for driving a recording beam in order to record a reproduction image, comprising the steps of:
   (a) varying a feeding pitch of an input scanning beam in the sub-scanning direction in steps according to a specified magnification ratio;
   (b) reading the image data from the memory locations;
   (c) skipping or overlapping some of the addresses of the memory locations according to the specified magnification ratio;
   (d) averaging mixed data of regular image data and image data to be thinned out; and
   (e) recording the reproduction image instead of using only the regular image data themselves.

3. A system for performing magnification conversion in an image reproducing system, in which image data obtained by scanning an original picture by an input scanning beam in main and sub-scanning directions are written in a plurality of memory locations identified by a plurality of addresses and the image data are used for driving a recording beam in order to record a reproduction image, comprising:
   (a) a feeding means for feeding the input scanning beam in the sub-scanning direction in a step-like manner in several pitches according to a specified magnification ratio;

(b) a feeding means for feeding a recording beam in a step-like manner in the sub-scanning direction for recording pixels;

(c) a means for designating addresses of the stored data for output to the feeding means for said recording beam; and (d) an averaging means for averaging mixed data of the regular image data and image data to be thinned out.

4. A method for performing magnification conversion in an image reproducing system, in which image data obtained from scanning of an original picture in main and sub-scanning directions are written into a memory and the image data are used for driving a recording beam in order to record a reproduction image, comprising the steps of:

(a) varying a feeding pitch of an input scanning beam in the sub-scanning direction in a step-like manner according to a specified magnification ratio;

(b) scanning an original picture in a skipped or in an overlapped fashion by using said input scanning beam according to a specified magnification ratio; and (c) stepwise varying the size of the input scanning beam at least in the sub-scanning direction according to a specified magnification ratio.

5. A method for performing magnification conversion in an image reproducing system, in which image data obtained from scanning of an original picture in main and sub-scanning directions are written into a memory and the image data are used for driving a recording beam in order to record a reproduction image, comprising the steps of:

(a) varying a feeding pitch of an input scanning beam in the sub-scanning direction in a step-like manner according to a specified magnification ratio;

(b) scanning an original picture in a skipped or in an overlapped fashion by using said input scanning beam according to a specified magnification ratio; and (c) picking up image data corresponding to scanning lines to be skipped over together with image data of regular scanning lines.

6. A system for performing magnification conversion in an image reproducing system, in which image data obtained from scanning of an original picture in main and sub-scanning directions are written into a memory and the image data are used for driving a recording beam in order to record a reproduction image, comprising:

(a) a means for feeding an input scanning beam in the sub-scanning direction in steps in one of several pitches according to a specified magnification ratio and scanning an original picture in a skipped or overlapped fashion by using said input scanning beam according to the specified magnification ratio; and (b) a means for feeding a recording beam in the sub-scanning direction in a constant pitch for scanning pixels, including:

(1) a magnification ratio setting circuit;

(2) a rate multiplier to determine scanning lines to be skipped over or to be read again according to the specified magnification ratio input from the magnification ratio setting circuit;

(3) a step motor controlling circuit which controls a step-motor according to the output of the multiplier; and (4) a step motor which feeds the recording beam in the sub-scanning direction.

7. A system for performing magnification conversion in an image reproducing system, in which image data obtained from scanning of an original picture in main and sub-scanning directions are written into a memory and the image data are used for driving a recording beam in order to record a reproduction image, comprising:

(a) a means for feeding an input scanning beam in the sub-scanning direction in steps in one of several pitches according to a specified magnification ratio and scanning an original picture in a skipped or overlapped fashion by using said input scanning beam according to the specified magnification ratio; and (b) a means for feeding a recording beam in the sub-scanning direction in a constant pitch for scanning pixels, including:

(1) a magnification ratio setting circuit;

(2) a rate multiplier to determine scanning lines to be skipped over or to be read again according to the specified magnification ratio input from the magnification ratio setting circuit;

(3) a step motor controlling circuit which controls a step-motor according to the output of the multiplier; and (4) a step motor which feeds a photosensitive film in the sub-scanning direction.

8. In a method for performing magnification conversion in an image producing system in which image data obtained by scanning an original picture with an input beam are written into a memory and the image data from the memory are used for driving a recording beam to record a reproduction image, the improvement comprising the steps of:

(a) varying the size of the input scanning beam at least in the sub-scanning direction according to a specified magnification ratio, (b) varying feeding pitch of the input scanning beam in at least the sub-scanning direction according to said magnification ratio, and (c) reading the image data from particular addresses in the memory in accordance with the specified magnification ratio.

9. In a system for performing magnification conversion in an image reproducing system in which image data obtained by scanning an original picture with an input scanning beam are written into a memory and are thereafter used for driving a recording beam to record a reproduction image, the improvement comprising:

(a) means for varying the size of the input scanning beam at least in the sub-scanning direction in a step-like manner according to a specified magnification ratio;

(b) first feeding means for feeding the input scanning beam in a step-like manner and in one of several pitches in the sub-scanning direction according to said magnification ratio;

(c) second feeding means for feeding a recording beam in the sub-scanning direction in a step-like manner; and (d) designating means for designating addresses of image data in accordance with said magnification ratio.

10. A system for performing magnification conversion in an image reproducing system, in which image data obtained by scanning an original picture by an input scanning beam in main and sub-scanning directions are written in a plurality of memory locations identified by a plurality of addresses and the image data are used for driving a recording beam in order to record a reproduction image, comprising:
- (a) a feeding means for feeding the input scanning beam in the sub-scanning direction in a step-like manner in several pitches according to a specified magnification ratio;
- (b) a feeding means for feeding a recording beam in a step-like manner in the sub-scanning direction for recording pixels;
- (c) a means for designating addresses of the stored data for output to the feeding means for said recording beam; and further comprising means for varying the size of the input scanning beam at least in the sub-scanning direction in a step-wise manner according to the specified magnification ratio.

11. A system for performing magnification conversion in an image reproducing system, in which image data obtained from scanning of an original picture in main and sub-scanning directions are written into a memory and the image data are used for driving a recording beam in order to record a reproduction image, comprising:
- (a) a means for feeding an input scanning beam in the sub-scanning direction in steps in one of several pitches according to a specified magnification ratio and scanning an original picture in a skipped or overlapped fashion by using said input scanning beam according to the specified magnification ratio; and
- (b) a means for feeding a recording beam in the sub-scanning direction in a constant pitch for scanning pixels, and
- (c) means for varying the size of the input scanning beam at least in the sub-scanning direction in a step-wise manner according to the specified ratio.

12. In a method for performing magnification conversion in an image producing system in which image data obtained by scanning an original picture with an input beam are written into a memory and the image data from the memory are used for driving a recording beam to record a reproduction image, the improvement comprising the steps of:
- (a) varying the size of the input scanning beam at least in the sub-scanning direction according to a specified magnification ratio,
- (b) varying feeding pitch of the input scanning beam in at least the sub-scanning direction according to said magnification ratio, and
- (c) scanning the original picture in a skipped fashion or in an overlapped fashion by feeding said input scanning beam in accordance with the specified magnification ratio.

13. In a system for performing magnification conversion in an image reproducing system in which image data obtained by scanning an original picture with an input scanning beam are written into a memory and are thereafter used for driving a recording beam to record a reproduction image, the improvement comprising:
- (a) means for varying the size of the input scanning beam at least in the sub-scanning direction in a step-like manner according to a specified magnification ratio;
- (b) first feeding means for feeding the input scanning beam in a step-like manner and in one of several pitches in the sub-scanning direction according to said magnification ratio;
- (c) second feeding means for feeding a recording beam in the sub-scanning direction in a constant pitch manner; and
- (d) designating means for designating portions of the original picture to be skipped or overlapped by said input scanning beam in accordance with said magnification ratio.

* * * * *